(12) United States Patent
He et al.

(10) Patent No.: US 12,342,345 B2
(45) Date of Patent: Jun. 24, 2025

(54) SCHEDULING MULTIPLE DOWNLINK TRANSMISSIONS USING A SINGLE DOWNLINK CONTROL TRANSMISSION

(71) Applicant: Apple Inc., Cupertino, CA (US)

(72) Inventors: Hong He, Cupertino, CA (US); Dawei Zhang, Saratoga, CA (US); Haitong Sun, Irvine, CA (US); Wei Zeng, San Diego, CA (US); Chunhai Yao, Beijing (CN); Yushu Zhang, Beijing (CN); Oghenekome Oteri, San Diego, CA (US); Huaning Niu, San Jose, CA (US); Chunxuan Ye, San Diego, CA (US); Seyed Ali Akbar Fakoorian, San Diego, CA (US); Weidong Yang, San Diego, CA (US); Jie Cui, San Jose, CA (US); Yang Tang, Cupertino, CA (US); Sigen Ye, Whitehouse Station, NJ (US)

(73) Assignee: Apple Inc., Cupertino, CA (US)

( * ) Notice: Subject to any disclaimer, the term of this patent is extended or adjusted under 35 U.S.C. 154(b) by 477 days.

(21) Appl. No.: 17/441,854

(22) PCT Filed: Apr. 6, 2021

(86) PCT No.: PCT/CN2021/085574
§ 371 (c)(1),
(2) Date: Sep. 22, 2021

(87) PCT Pub. No.: WO2022/213244
PCT Pub. Date: Oct. 13, 2022

(65) Prior Publication Data
US 2022/0361218 A1   Nov. 10, 2022

(51) Int. Cl.
*H04W 72/23* (2023.01)
(52) U.S. Cl.
CPC .................. *H04W 72/23* (2023.01)

(58) Field of Classification Search
CPC .... H04W 72/23; H04L 5/0096; H04L 5/0053; H04L 5/0007
See application file for complete search history.

(56) References Cited

U.S. PATENT DOCUMENTS

| 2019/0342035 A1 | 11/2019 | Zhang et al. |
| 2020/0154414 A1 | 5/2020 | Sun |

(Continued)

FOREIGN PATENT DOCUMENTS

| CN | 110582974 | 12/2019 |
| WO | 2020090367 A1 | 5/2020 |

(Continued)

OTHER PUBLICATIONS

International Search Report and Written Opinion for PCT/CN2021/085574; 9 pages; Jan. 6, 2022.

(Continued)

*Primary Examiner* — Peter P Chau
(74) *Attorney, Agent, or Firm* — Kowert, Hood, Munyon, Rankin & Goetzel, P.C.

(57) ABSTRACT

This disclosure relates to techniques for scheduling multiple downlink transmissions using a single downlink control transmission in a wireless communication system. A wireless device may determine a beam configuration for use for receiving multiple downlink transport blocks scheduled by a single downlink control transmission. In some instances, the wireless device may be configured to skip one or more control channel monitoring occasions that overlap with the downlink transport blocks. The wireless device may provide hybrid automatic repeat request feedback for the downlink transport blocks.

20 Claims, 21 Drawing Sheets

(56) References Cited

U.S. PATENT DOCUMENTS

2020/0244528 A1* 7/2020 He .................... H04L 1/0003
2020/0389874 A1   12/2020 Lin
2021/0006376 A1   1/2021 Cirik et al.
2021/0092744 A1*  3/2021 Khoshnevisan ...... H04L 5/0053
2021/0234640 A1*  7/2021 Cirik .................... H04W 72/23

FOREIGN PATENT DOCUMENTS

WO      2020/235884      11/2020
WO     2021028044 A1     2/2021

OTHER PUBLICATIONS

Extended European Search Report for EP Patent Application No. 21873699.9; Jun. 9, 2023.
1 Extended European Search Report for EP Patent Application No. 21873699.9; Jun. 9, 2023.

* cited by examiner

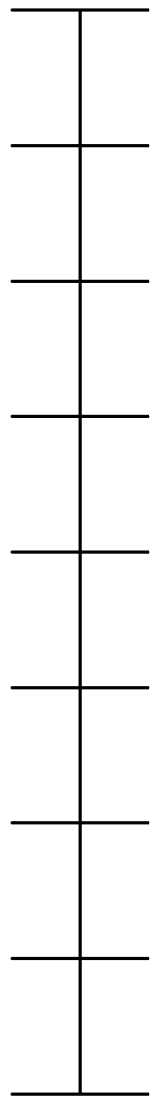

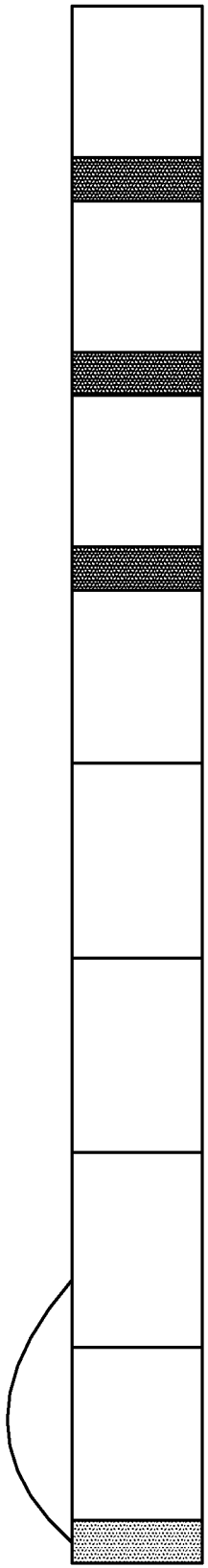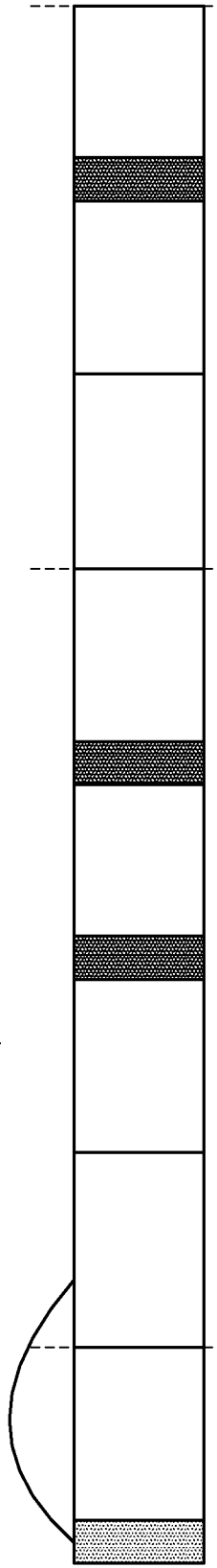
FIG. 20
FIG. 21

| Index | DCI Format pairs |
|---|---|
| 0 | DCI Format <0-0, 1-0> |
| 1 | DCI Format <1-1, 0-1> (Non-fallback DCI) |
| 2 | DCI Format <1-2, 0-2> (For support of URLLC application) |
| 3 | DCI Format <1-x, 0-x> (M-DCI Format for M-PDSCH/M-PUSCH) |

FIG. 22

| Codec-state | $\omega_0, \omega_1, \omega_2, \omega_3, \ldots, \omega_{(n-1)}$ |
|---|---|
| '00' | [0, 0, 0, 0, ....., 0, 0, 0, 0] |
| '01' | [1, 1, 1, 1, ....., 1, 1, 1, 1] |
| '10' | [1, 0, 1, 0, 1, 0, ....., 1, 0, 1, 0] |
| '11' | [0, 1, 0, 1, 0, 1, ....., 0, 1, 0, 1] |

FIG. 23

The RBs are divided into two parts and mapped to two edges of PDSCH BW

The RBs are divided into three sub-groups and mapped to different RBs across the PDSCH BW

| X=3 bits | K | Y |
|---|---|---|
| 000 | 1 | 1 or 9 or 17 or 25 or 33 ... |
| 001 | 2 | 2 or 10 or 18 or 26 or 34 ... |
| 010 | 3 | 3 or 11 or 19 or 27 or 35 ... |
| 011 | 4 | 4 or 12 or 20 or 28 or 36 ... |
| 100 | 5 | 5 or 13 or 21 or 29 or 37 ... |
| 101 | 6 | 6 or 14 or 22 or 30 or 38 ... |
| 110 | 7 | 7 or 15 or 23 or 31 or 39 ... |
| 111 | 8 | 8 or 16 or 24 or 32 or 40 ... |

FIG. 31

| DMRS CS | Y |
|---|---|
| CS0 | 1 or 7 or 13 ... |
| CS2 | 2 or 8 or 14 ... |
| CS4 | 3 or 9 or 15 ... |
| CS6 | 4 or 10 or 16 ... |
| CS8 | 5 or 11 or 17 ... |
| CS10 | 6 or 12 or 18 ... |

FIG. 32

SCHEDULING MULTIPLE DOWNLINK TRANSMISSIONS USING A SINGLE DOWNLINK CONTROL TRANSMISSION

PRIORITY CLAIM INFORMATION

This application is a U.S. National Stage application of International Application No. PCT/CN2021/085574, filed Apr. 6, 2021, titled "Scheduling Multiple Downlink Transmissions Using a Single Downlink Control Transmission", which is hereby incorporated by reference in its entirety.

FIELD

The present application relates to wireless communications, and more particularly to systems, apparatuses, and methods for scheduling multiple downlink transmissions using a single downlink control transmission in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHIRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for scheduling multiple downlink transmissions using a single downlink control transmission in a wireless communication system.

The techniques presented herein include techniques for determining a beam configuration for use for receiving multiple downlink transport blocks scheduled by a single downlink control transmission.

Additionally, techniques are presented herein for configuring a wireless device to skip one or more control channel monitoring occasions that temporally overlap with a set of multiple downlink transport blocks that are scheduled by a single downlink control transmission.

Techniques are also described herein for configuring opportunities to provide control information within a set of multiple downlink transport blocks that are scheduled by a single downlink control transmission, for example using a downlink shared channel instead of a downlink control channel.

Further, techniques are presented herein for configuring and providing hybrid automatic repeat request feedback for a set of multiple downlink transport blocks that are scheduled by a single downlink control transmission, which may increase the likelihood that the hybrid automatic repeat request codebook sizes for such a transmission are aligned between a wireless device and a cellular base station.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 10-11 illustrate exemplary aspects of a possible technique for signaling a default transmission control indicator for downlink transmissions in a scenario in which multiple downlink transmissions can be scheduled using a single downlink control transmission, according to some embodiments;

FIGS. 14-21 illustrate exemplary aspects of further possible techniques for configuring skipping of certain control signal monitoring occasions in a scenario in which multiple downlink transmissions can be scheduled using a single downlink control transmission, according to some embodiments;

FIGS. 22-23 illustrate exemplary aspects of possible techniques for determining downlink control information format and payload size in a scenario in which multiple downlink transmissions can be scheduled using a single downlink control transmission, according to some embodiments;

FIGS. 29-32 illustrate exemplary aspects of various possible techniques for signaling a downlink assignment index configuration for use in a scenario in which multiple downlink transmissions can be scheduled using a single downlink control transmission, according to some embodiments.

Figure 1:
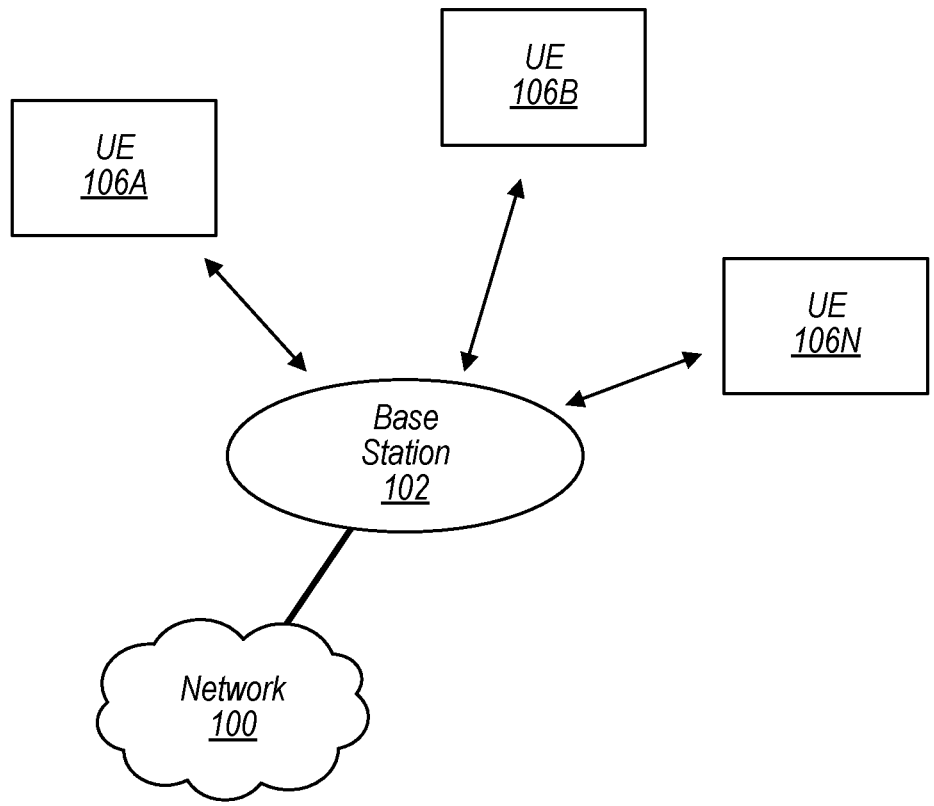
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
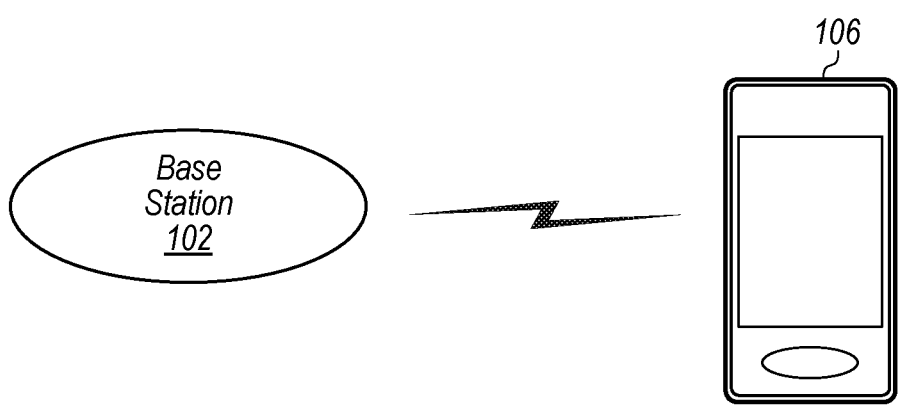
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for receiving multiple downlink transmissions that are scheduled using a single downlink control transmission in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
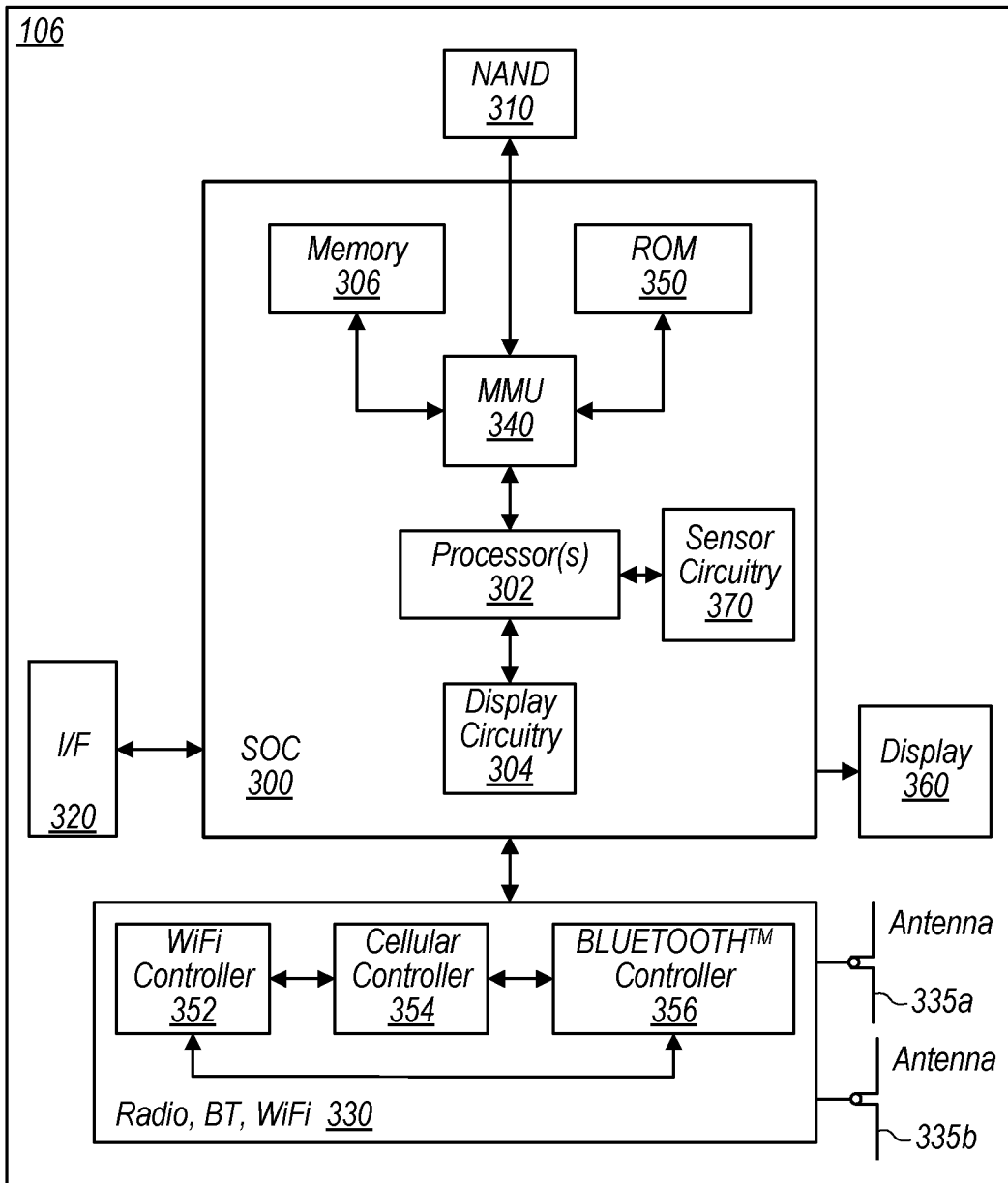
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for receiving multiple downlink transmissions scheduled using a single downlink control transmission in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for receiving multiple downlink transmissions scheduled using a single downlink control transmission in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
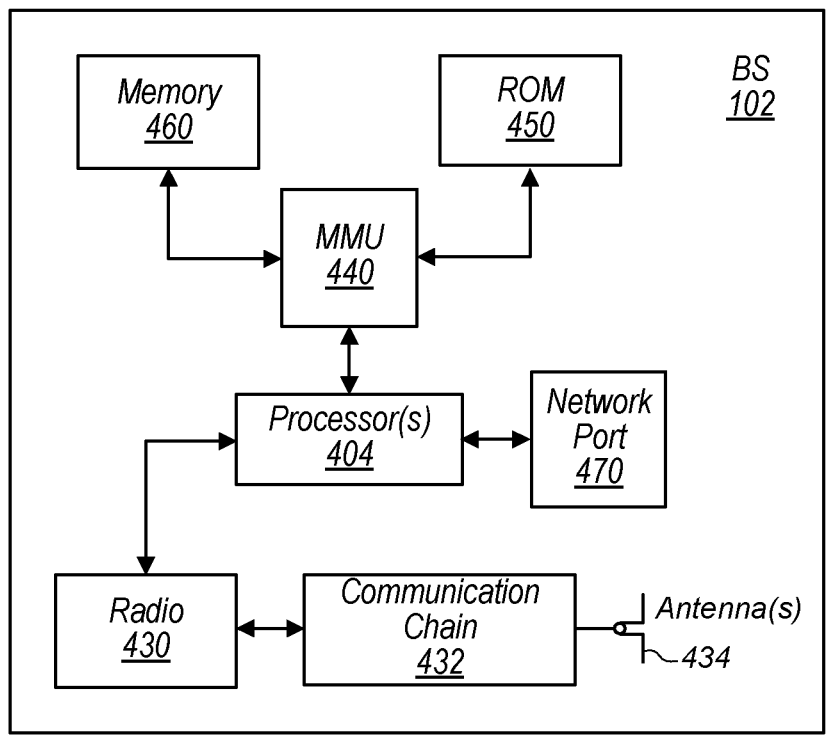
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, for example including scheduling multiple downlink transmissions using a single downlink control transmission, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
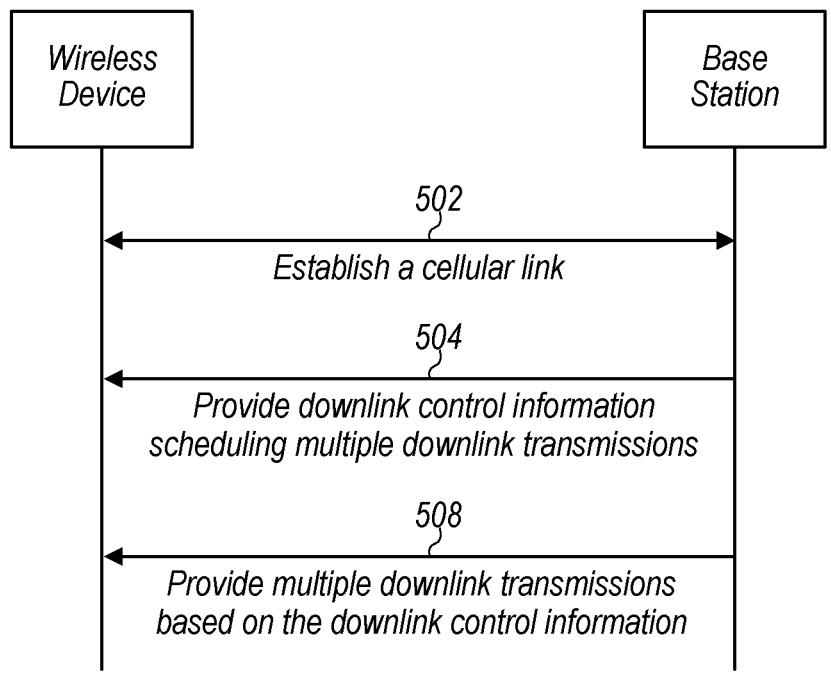
FIG. 5 is a flowchart diagram illustrating aspects of an exemplary possible method for scheduling multiple downlink transmissions using a single downlink control transmission in a wireless communication system, according to some embodiments.

FIG. 5—Scheduling Multiple Downlink Transmissions Using a Single Downlink Control Transmission According to cellular communication technologies, it may generally be possible for a cellular base station to communicate wirelessly with a wireless device. Such communication can be scheduled using downlink control information (DCI), which may be provided using control signaling such as on a physical downlink control channel (PDCCH) that may be transmitted in one or more control resource sets (CORESETs). A single DCI transmission may schedule a wireless device to receive information via a single instance (e.g., slot) of a downlink shared channel (e.g., a physical downlink shared channel (PDSCH)). Alternatively, according to the techniques described herein, it may be possible for a single DCI transmission to schedule a wireless device to receive information during multiple downlink shared channel instances. Such techniques may have the potential to reduce wireless device power consumption and/or improve network resource utilization, among various possibilities. Such techniques may require and/or benefit from a variety of supporting techniques to enable effective network and wireless device operation, at least according to some embodiments. Numerous such techniques are also described herein.

FIG. 5 is a communication flow diagram illustrating such a method for scheduling multiple downlink transmissions using a single downlink control transmission in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the wireless device may receive first downlink control information (DCI) scheduling multiple downlink transmissions (e.g., multiple downlink transport blocks). The first DCI may be received via a control channel (e.g., a physical downlink control channel (PDCCH)), for example in a control resource set (CORESET) provided during a control channel monitoring opportunity (MO). In some embodiments, it may also be possible for the first DCI to be received via control signaling carried on a data or shared channel (e.g., a physical downlink shared channel (PDSCH)). For example, in some instances, it may be possible for a serving cell to provide "virtual DCI" (or V-DCI) in certain portions of PDSCH transmissions according to certain embodiments described herein, and the first DCI could be received in such a V-DCI transmission.

In 506, the wireless device may receive the downlink transmissions scheduled by the first DCI, e.g., based at least in part on the first DCI. The wireless device may select a receive beam for the downlink transmissions and may use the selected receive beam to receive the downlink transmissions. Note that, at least in some instances, the selected receive beam may be applied for reception of downlink transmissions scheduled by the first downlink control information with less than a configured time offset between the first downlink control information and the downlink transport blocks, where the configured time offset is a quasi-co-located (QCL) duration threshold, such as may be configured with a 'timeDurationForQCL' parameter.

In some instances, the receive beam selected for the downlink transmissions may be determined based on an indication received from the cellular base station via RRC signaling. For example, the cellular base station may provide an indication of a TCI state (e.g., a default TCI state for a serving cell and bandwidth part used to provide the first DCI) via RRC, and the wireless device may select a receive beam in accordance with the indicated TCI state.

As another possibility, the receive beam may be selected implicitly, based on one or more fixed (e.g., specified) or configured conditions and/or considerations. For example, the wireless device may provide an indication of a preferred spatial QCL configuration to the cellular base station when performing beam reporting, and the receive beam may be implicitly selected based on that indication. For example, the wireless device and the cellular base station may each autonomously determine/use that configuration for the default TCI state when multiple downlink transport blocks are scheduled together using a single DCI transmission. Another technique could include implicitly selecting the receive beam in accordance with a TCI state with a lowest index in a list of TCI states indicated by the cellular base station via RRC signaling. Still another technique could include implicitly selecting the receive beam in accordance with a TCI state of a CORESET associated with a monitored search space with a lowest index in a latest slot in which one or more CORESETS are monitored by the wireless device (e.g., within the active BWP of the serving cell of the first DCI).

In some instances, DCI based TCI state determination may be used for the beam selection. For example, the first receive beam may be selected based at least in part on a latest indication of a TCI state in previously received downlink control information that scheduled multiple downlink transport blocks. In some instances, a further condition that hybrid automatic repeat request (HARQ) feedback for the downlink transport blocks scheduled by the previously received downlink control information was provided at least a threshold amount of time before the first DCI is received may be applied, e.g., so that the network can confirm that the indication of the TCI state in the previously received DCI was received by the wireless device and that the wireless device and the cellular base station will be using the same QCL assumption for the downlink transport blocks scheduled by the first DCI.

In some instances, a multi-stage TCI state configuration approach may be used. For example, it may be possible for the cellular base station to indicate a set of possible default TCI states via RRC signaling, and for lower layer signaling to be used for dynamic selection of one of the configured default TCI states. As one such possibility, an indication of a default TCI state may be received via media access control (MAC) control element (CE) signaling, where the default TCI state is selected from the RRC configured set of TCI states. The receive beam for the downlink transport blocks scheduled by the first DCI may accordingly be selected based on the default TCI state indicated via the MAC CE signaling. As another such possibility, an indication of a default TCI state may be received via group-common DCI signaling, where the default TCI state is selected from the RRC configured set of TCI states. The receive beam for the downlink transport blocks scheduled by the first DCI may accordingly be selected based on the default TCI state indicated via the group-common DCI signaling. As a still further possibility, an indication of a default TCI state may be received via dedicated DCI signaling, where the default TCI state is selected from the RRC configured set of TCI states. The receive beam for the downlink transport blocks scheduled by the first DCI may accordingly be selected based on the default TCI state indicated via the dedicated DCI signaling.

Note that in some embodiments, it may be possible that one or more control channel monitoring occasions temporally overlap with and/or occur between downlink transport blocks scheduled by the first downlink control information, and further that in at least some instances one or more such control channel monitoring occasions may use a different beam configuration than the downlink transport blocks overlapping with, scheduled immediately before, and/or scheduled immediately after the control channel monitoring occasion(s).

For example, as one possibility, the wireless device may monitor a control channel during a second control channel monitoring occasion that occurs between receiving downlink transport blocks scheduled by the first DCI, where a different receive beam is used to monitor the control channel during the second control channel monitoring occasion than at least the downlink transport blocks scheduled by the first DCI that occur prior to the second control channel monitoring occasion. In such a scenario, it may be the case that a switching gap is applied before the second control channel monitoring occasion, e.g., to allow sufficient time for beam switching by the wireless device. In some instances, there may also be a switching gap applied after the second control channel monitoring occasion, e.g., if downlink transport blocks scheduled by the first DCI that occur after the second control channel monitoring occasion also use a different receive beam than the second control channel monitoring occasion. If one or more such switching gaps are used, it may be the case that the length of the switching gap is fixed for all wireless devices, e.g., regardless of subcarrier spacing configuration, or it may be the case that the length of the switching gap depends on the subcarrier spacing configuration, for example such that a longer switching gap is used for higher subcarrier spacing configurations, among various possibilities.

In some instances, different downlink transmissions scheduled by the first DCI may be received using different beams. For example, as previously noted herein, in some instances it may be possible that the wireless device implicitly selects the receive beam for downlink transport blocks scheduled by the first DCI based at least in part on a TCI state of a CORESET associated with a monitored search space with a lowest index in a latest slot in which one or more CORESETS are monitored by the wireless device. Thus, under such a configuration, in the preceding scenario in which a second control channel monitoring occasion occurs between downlink transport blocks scheduled by the first DCI, it may be possible that the beam used for downlink transport blocks that occur after the second control channel monitoring occasion may be the same beam as used for control channel monitoring during the second control channel monitoring occasion. In such a scenario, it may be the case that no switching gap is needed after the second control channel monitoring occasion, e.g., since the same beam may continue to be used for the downlink transport blocks scheduled immediately following the second control channel monitoring occasion.

According to some embodiments, it may be desirable to cancel some or all control channel monitoring occasions that are temporally overlapping with a set of downlink transport blocks scheduled by a single DCI. For example, not all such occasions may be considered necessary if downlink transport block reception is already scheduled for multiple downlink transport blocks, and/or it may be considered beneficial (e.g., for improved resource use efficiency and/or power saving) to avoid the need for switching gaps to monitor CORESET resources that are configured with a different beam configuration than the scheduled downlink transport blocks. Accordingly, in some embodiments, it may be possible for a cellular base station to provide an indication to the wireless device that one or more control channel monitoring occasions that temporally overlap with the downlink transport blocks scheduled by the first downlink control information are canceled, e.g., at least for the wireless device. Such an indication may be provided in the first DCI, and/or using any of various other possible techniques. In some instances, such a cancellation indication may apply to some or all control channel monitoring occasions after a certain configured delay (e.g., to account for processing time and/or other considerations). In some instances, such a cancellation indication may apply to all control channel monitoring occasions temporally overlapping with the downlink transport blocks scheduled by the first DCI (e.g., after the configured delay), or all but a certain number (e.g., the last 1, the last 2, etc.) of control channel monitoring occasions temporally overlapping with the downlink transport blocks scheduled by the first DCI (e.g., after the configured delay).

In some embodiments, it may be possible that a 'skipping' indication that indicates to the wireless device to skip one or more control channel monitoring opportunities within a multi-slot set of downlink transport blocks can be configured additionally or alternatively to a control channel monitoring opportunity cancellation indication, e.g., to reduce power consumption and/or improve resource use efficiency.

For example, in some instances, the first DCI may include an indication to skip one or more subsequent control channel monitoring occasions. In some embodiments, the indication to skip one or more subsequent control channel monitoring occasions may indicate to skip all control channel monitoring occasions within a configured time window. In some embodiments, the indication to skip one or more subsequent control channel monitoring occasions may indicate to skip a subset of control channel monitoring occasions within a configured time window. For example, the subset of control channel monitoring occasions within the configured time window to skip may include all but a configured number (e.g., the last 1, the last 2, etc.) and/or type (e.g., single slot PDCCH monitoring occasions and/or multi-slot PDCCH monitoring occasions) of control channel monitoring occasions.

In some embodiments, the window to which the skipping indication is applied may begin a configured number of orthogonal frequency division multiplexing (OFDM) symbols after the last OFDM symbol of the first control channel monitoring occasion. The configured number of OFDM symbols may be selected to provide sufficient time for the wireless device to process and apply the skipping indication, according to some embodiments. Other mechanisms for determining the start of the skipping window (e.g., using different units of measurement to define the window, different considerations determining when the window begins, etc.) are also possible.

In some embodiments, the configured window may end at a last OFDM symbol of the multiple downlink transport blocks scheduled by the first downlink control information. As another possibility, the configured time window may have a duration equal to a minimum or maximum total number of start and length indicators (SLIVs) configured for downlink transport blocks scheduled by the first downlink control information. For example, if 2 time domain resource assignment (TDRA) combinations are configured by RRC, and those combinations include TDRA 1/2/3 or TDRA 4/5, it may be the case that the maximum number of TDRA that can be scheduled by a single DCI is 3 and the minimum number of TDRA that can be scheduled by a single DCI is 2. Whether the minimum or maximum number of SLIVs is used may be configured via higher layer signaling (e.g., RRC signaling), fixed/predetermined (e.g., specified in wireless communication technology specifications), or may be determined in any of various other possible ways, in such a scenario. As a further possibility, the skipping window may be configured to end at a first OFDM symbol of the next control channel monitoring occasion of the same search space set as the first control channel monitoring occasion. As a further possibility, the wireless device may receive an indication (e.g., via RRC signaling, MAC CE signaling, DCI signaling, etc.) of the duration of the skipping window. In some instances, the duration of the skipping window may be indicated from a set of possible skipping window durations, which may include one or more explicitly configured skipping window durations, one or more implicitly determined skipping window durations (which may be determined using one or more of the techniques described herein for implicitly determining the skipping window duration), or a combination thereof, at least according to various embodiments.

As previously noted herein, it may be possible that control information (V-DCI) can be dynamically conveyed as part of one or more of the downlink transport blocks scheduled by the first DCI (and/or by other DCI transmissions). For example, certain portions of certain downlink transport blocks may be configured (e.g., explicitly or implicitly) as potentially having V-DCI included, the wireless device may be able to identify those portions, and the wireless device may monitor those portions for V-DCI. Note that the identified portions may or may not actually include V-DCI for the wireless device, e.g., depending on whether the serving cell has control information to provide to the wireless device (e.g., for scheduling subsequent downlink and/or uplink transmissions), for example similar to at least some downlink control channel monitoring opportunities, and thus may in some instances be referred to as V-DCI monitoring opportunities.

The V-DCI monitoring opportunities may be configured to occur periodically, according to various embodiments. As one possibility, a V-DCI monitoring opportunity may be present in each downlink transport block scheduled by the first DCI. As another possibility, the wireless device may determine a set of periodic V-DCI monitoring opportunity configurations (e.g., may receive such information via RRC signaling or may be preconfigured with a set of periodic V-DCI monitoring opportunity configurations in accordance with wireless communication standard specifications), and may receive information indicating a periodic V-DCI monitoring opportunity configuration that is selected from the configured set of periodic V-DCI monitoring opportunity configurations in the first DCI. For example, the set of periodic V-DCI monitoring opportunity configurations could include a set of applicable values representing periodicity, in units of slots, of V-DCI monitoring opportunities within downlink transport blocks scheduled by the first DCI, such as <1,2,4,8>. As another example, the set of periodic V-DCI monitoring opportunity configurations could include a set of applicable values representing the total number of V-DCI monitoring opportunities within downlink transport blocks scheduled by the first DCI, where the periodicity at which the configured number of V-DCI monitoring opportunities occur can be determined using a pre-configured equation based at least in part on the total number of downlink transport blocks scheduled by the first DCI.

In some embodiments, the V-DCI monitoring opportunities may be configured to occur aperiodically. As one such possibility, the wireless device may receive information configuring a set of virtual downlink control information monitoring opportunity pattern bitmaps, e.g., where each bit of a V-DCI monitoring opportunity pattern bitmap indicates whether a V-DCI monitoring opportunity is present in a downlink transport block represented by the bit. The set of virtual downlink control information monitoring opportunity pattern bitmaps may be fixed/pre-configured (e.g., in wireless communication standard specifications) or configured via RRC signaling, among various possibilities. The first DCI may indicate a V-DCI monitoring opportunity pattern bitmap that is selected from the configured set of V-DCI monitoring opportunity pattern bitmaps, based on which the wireless device may be able to determine in which downlink transport blocks V-DCI monitoring opportunities are present.

Note that in case the bitmap length is not equal to the number of downlink transport blocks scheduled by the first DCI, the bitmap may be truncated (e.g., if the bitmap contains more bits than there are downlink transport blocks) or repeated (e.g., if the bitmap contains fewer bits than there are downlink transport blocks) and possibly also truncated (e.g., if the number of downlink transport blocks is not evenly divisible by the number of bits in the bitmap), e.g., at least according to some embodiments. For example, such truncation/repetition may be applied to the bitmap to obtain a one-to-one mapping between the effective length of the indicated V-DCI monitoring opportunity pattern bitmap and the number of downlink transport blocks to which the indicated V-DCI monitoring opportunity pattern bitmap is to be applied.

In at least some instances, the wireless device may be able to determine one or more V-DCI formats associated with V-DCI monitoring opportunities. For example, in some instances, V-DCI format information for V-DCI monitoring opportunities included in downlink transport blocks scheduled by the first DCI may be included in a field of the first DCI. As another example, in some instances, V-DCI format information for V-DCI monitoring opportunities included in downlink transport blocks scheduled by the first DCI may be indicated implicitly by way of a scrambling sequence used to scramble cyclic redundancy check (CRC) bits of the first DCI. According to some embodiments, the V-DCI format information may include an indication of a pair of DCI formats to be used for V-DCI, such as a DCI format to be used for scheduling uplink transmissions and a DCI format to be used for scheduling downlink transmissions. A set of possible pairs of DCI formats that can be indicated (e.g., explicitly or implicitly) by the first DCI may be fixed/pre-configured (e.g., in wireless communication standard specifications) or configured via RRC signaling, among various possibilities. Note that if one of the DCI formats in a DCI format pair is shorter than the other DCI format in the DCI format pair, it may be the case that zero padding bits are appended to the shorter DCI format in the DCI format pair to match the payload size of the larger DCI format in the DCI format pair.

There may be multiple possibilities for determining how the V-DCI portions of downlink transport blocks are channel coded, modulated, and/or which resources of a downlink transport block are associated with a V-DCI monitoring opportunity. For example, with respect to channel coding, it may be possible that polar code is used for V-DCI portions of a downlink transport block while low density parity code (LDPC) is used for downlink shared channel (DL-SCH) portions of the downlink transport block.

In some instances, it may be uniformly assumed that V-DCI resources are quadrature phase shift keying (QPSK) modulated. In such a scenario, it may be the case that the number of resources associated with V-DCI monitoring opportunities may be indicated to the wireless device by the cellular base station. For example, the first DCI may indicate an aggregation level (AL) for the V-DCI from a set of ALs that may be fixed/pre-configured (e.g., in wireless communication standard specifications) or configured via RRC signaling, from which the wireless device may be able to determine an amount of resources (e.g., in units of control channel elements (CCEs)) associated with V-DCI monitoring opportunities. As another possibility, one CCE aggregation level may be configured via RRC signaling. As a still further possibility, MAC CE signaling may be used to indication the AL for the V-DCI from the configured set of ALs.

The mapping of the V-DCI to downlink transport block resources may also be determined in any of a variety of possible ways. As one possibility, for a downlink transport block scheduled by the first DCI that includes a V-DCI monitoring opportunity, the V-DCI monitoring opportunity (and the V-DCI, if present) may be mapped to resource elements of the downlink transport block that are not reserved for other purposes in increasing order of frequency first and time second. As another possibility, the V-DCI monitoring opportunity (and the V-DCI, if present) may be mapped to resource elements of the downlink transport block distributed at edges of the bandwidth of the downlink transport block; for example, half of the resources of the V-DCI may be mapped to resource elements on one edge of the bandwidth of the downlink transport block while the other half of the resources of the V-DCI may be mapped to resource elements on the other edge of the bandwidth of the downlink transport block. As a still further possibility, the V-DCI monitoring opportunity (and the V-DCI, if present) may be mapped to resource elements that are interleaved with resources not associated with the V-DCI monitoring opportunity. Note that approaches that map the V-DCI to resources that are distributed at edges of the bandwidth of the downlink transport block and/or interleaved with non-V-DCI resources may obtain greater frequency diversity benefits than approaches that map the V-DCI to resources a contiguous block of frequency resources of the downlink transport block, at least according to some embodiments.

Note that in some instances, it may be possible that the modulation order of the V-DCI is not uniformly fixed. For example, it may be the case that the modulation order for V-DCI included in a downlink transport block scheduled by the first DCI matches the modulation order for the downlink transport blocks scheduled by the first DCI. In such a scenario, the wireless device may determine a scaling factor associated with the V-DCI, at least according to some embodiments. The value of the scaling factor may be fixed/pre-configured (e.g., in wireless communication standard specifications) or configured via RRC signaling, among various possibilities. The scaling factor may be used by the wireless device to determine the number of coded modulation symbols per layer for the V-DCI.

Once the wireless device has received the downlink transport blocks scheduled by the first DCI, the wireless device may transmit HARQ acknowledgement feedback to the cellular base station, e.g., to indicate whether the downlink transport blocks are successfully received. At least according to some embodiments, the HARQ feedback may be provided based at least in part on counter downlink assignment index (C-DAI) information and total downlink assignment index (T-DAI) information included in the first DCI. For example, the C-DAI information and the T-DAI information may be used by the wireless device to determine a payload size (e.g., including selecting a HARQ codebook size) for the HARQ feedback, e.g., in particular in case of one or more missed DCI transmissions when carrier aggregation is configured and DCI scheduling multiple downlink transport blocks is provided on each of multiple component carriers (CCs) during a control channel monitoring opportunity.

In some instances, a C-DAI design may be used such that the first DCI includes C-DAI information indicating an accumulated number of transport blocks up to a first transport block scheduled by the first downlink control information. Additionally, or alternatively, a T-DAI design may be used such that the first DCI includes T-DAI information indicating a total number of transport blocks scheduled through the first control channel monitoring occasion.

According to some embodiments, the size of the C-DAI information and/or the T-DAI information may be variable. In some instances, the size of one or both of the C-DAI information or the T-DAI information may be based at least in part on a (e.g., configured maximum) number of downlink transport blocks that can be scheduled by downlink control information on a CC on which the first DCI is received. Thus, in such a scenario, if a wireless device is configured with <TB1/2/3/4, TB5/6> as possible M-DCI downlink transport block scheduling options, the size of the C-DAI/

T-DAI may be log (max (4,2))=log 4=2 bits, at least according to some embodiments. As another possibility, an indication of the size of one or both of the C-DAI information or the T-DAI information may be received by the wireless device from the cellular base station, e.g., in broadcast system information or in dedicated RRC signaling. As a still further possibility, the size of the C-DAI information and/or the T-DAI information may be fixed/pre-configured (e.g., in wireless communication standard specifications).

In some instances, the wireless device may determine a set of possible HARQ codebook sizes for the HARQ feedback. As one possibility, the HARQ codebook size spacing in the set of possible HARQ codebook sizes may be uniformly quantized. In such a scenario, the wireless device may be able to determine a quantization step size of the set of possible HARQ codebook sizes in any of a variety of possible ways. For example, the wireless device may determine the quantization step size based on a fixed quantization step size parameter, an indication of a quantization step size parameter included in system information broadcast by the cellular base station, an indication of a quantization step size parameter provided to the wireless device by the cellular base station using RRC signaling, an indication of a quantization step size parameter included in the first DCI, or a number of downlink transport blocks that can be scheduled by DCI (e.g., for the CC on which the first DCI is transmitted), among various possibilities. As another possibility, the HARQ codebook size spacing in the set of possible HARQ codebook sizes may be non-uniformly quantized. For example, in some instances, larger quantization size(s) may be used when the HARQ codebook size(s) exceeds a configured threshold.

As previously noted, in some instances, it may be the case that multiple downlink transport blocks are scheduled by DCI transmissions on each of multiple CCs. For example, according to some embodiments, the first DCI and the downlink transport blocks scheduled by the first DCI may be received via a first CC, and second DCI that schedules multiple downlink transport blocks on a second CC may also be provided to the wireless device during the first control channel monitoring occasion. The second DCI may include C-DAI information an accumulated number of transport blocks up to a first transport block scheduled by the second DCI. The second DCI may also include T-DAI information indicating a total number of transport blocks scheduled through the first control channel monitoring occasion.

For a set of possible HARQ codebook sizes (e.g., which may be configured in any of various possible ways, including using any of the various techniques described herein for configuring a set of possible HARQ codebook sizes), the set may be sub-divided into multiple sub-groups. The cellular base station may be able to indicate from which sub-group to select the HARQ codebook size based on the ordering of the C-DAI information. For example, one sub-group may be indicated if the C-DAI information included in the first DCI and the second DCI is ordered in ascending order according to CC index, while the other sub-group may be indicated if the C-DAI information included in the first DCI and the second DCI is ordered in descending order according to CC index. Accordingly, the wireless device may be able to determine the sub-group of the set of possible HARQ codebook sizes for the HARQ feedback based at least in part on whether the C-DAI information included in the first DCI and the second DCI is ordered in ascending order or descending order according to CC index, at least according to some embodiments.

In some instances, the wireless device may provide an indication of the HARQ codebook size used to provide the HARQ feedback to the cellular base station. For example, the indication of the HARQ codebook size may be appended to the HARQ feedback, in some instances. Alternatively, the indication of the HARQ codebook size may be provided using a demodulation reference signal (DMRS) cyclic shift for the uplink transmission that includes the HARQ feedback. For example, the wireless device may select the DMRS cyclic shift from a set of configured DMRS cyclic shifts, where each configured DMRS cyclic shift is associated with a different indicator value. Note that the indication of the HARQ codebook size may fully indicate the HARQ codebook size, or may include partial information from which the cellular base station may be able to infer the HARQ codebook size, among various possibilities. For example, the indication could include 3 bits of information whose possible values are associated with index values between 1 and 8, where each index value is associated with a subset of all possible values, such that the cellular base station may be able to infer that the HARQ codebook size is one of the possible values associated with the indicated index. Similarly, the indication could be provided by selecting one of 6 configured DMRS cyclic shifts, where each configured DMRS cyclic shift indicates an index value between 1 and 6, where each index value is associated with a subset of all possible values, such that the cellular base station may be able to infer that the HARQ codebook size is one of the possible values associated with the indicated index.

Note that at least in some instances, there may be multiple possible C-DAI and/or T-DAI designs that can be used in the wireless communication system. Accordingly, at least according to some embodiments, it may be the case that the cellular base station provides an indication of a type of the C-DAI information and/or an indication of a type of the T-DAI information used by the cellular base station (e.g., in general, such as via system information, or specifically for the wireless device, such as via dedicated RRC signaling, among various possibilities).

Thus, at least according to some embodiments, the method of FIG. 5 may be used by a cellular network to schedule multiple downlink transmissions using a single downlink control transmission, and for a wireless device to receive such transmissions, which may increase the effectiveness and/or efficiency with which wireless communications can be scheduled and performed between a cellular base station and a wireless device, at least in some instances.

FIGS. 6-32 and Additional Information

FIGS. 6-32 illustrate further aspects that might be used in conjunction with the method of FIG. 5 if desired. It should be noted, however, that the exemplary details illustrated in and described with respect to FIGS. 6-32 are not intended to be limiting to the disclosure as a whole: numerous variations and alternatives to the details provided herein below are possible and should be considered within the scope of the disclosure.

Among various possible features and improvements to 3GPP based wireless communication techniques, one potential objective may include to support multi-PDSCH scheduling operation, preferably in a manner that can be performed with minimal UE power consumption and improved resource utilization. Such techniques may be beneficial for operation in both licensed spectrum and unlicensed spectrum. Unlicensed operation may particularly benefit from the potential to avoid multiple listen-before-talk (LBT)

procedures for multiple PDCCH transmissions such that the LBT efficiency may be improved, at least according to some embodiments.

As NR operation may be expanded to 71 GHz frequency range, beam management, in particular for frequency bands with >52.6 GHz (which may also be referred to as "frequency range 3" or "FR3" herein), may be of particular importance, e.g., since wireless communications on FR3 may tend to be highly susceptible to rapid channel variance and may suffer from sever free-space pathloss and atmospheric absorption.

Figure 6:
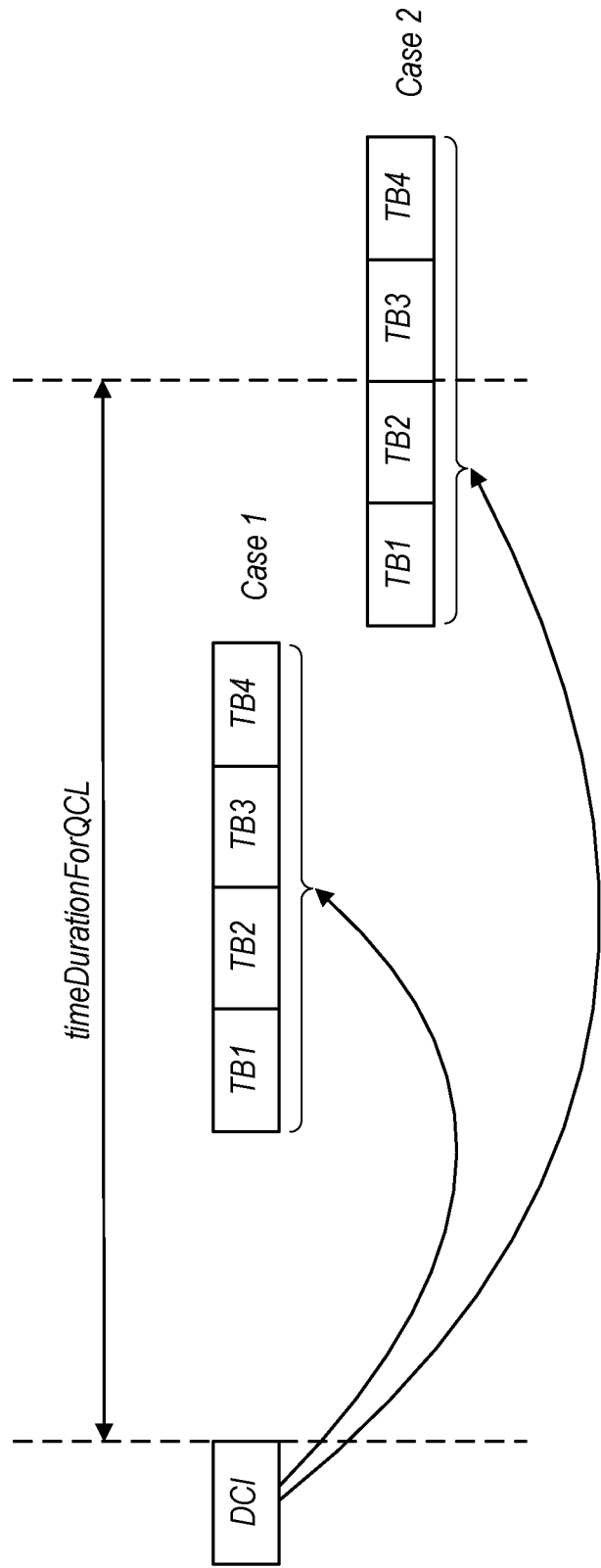
FIGS. 6-7 illustrate exemplary possible aspects of scenarios in which multiple downlink transmissions are scheduled using a single downlink control transmission, according to some embodiments.

As part of determining how to perform such beam management, it may be useful to provide a framework for a UE and a BS to determine/agree upon the quasi-co-located (QCL) assumption(s) that a UE should apply for each PDSCH instance when multiple PDSCH instances are scheduled by a single DCI instance. In some instances, a "timeDurationForQCL" parameter may be defined and configured for a UE using RRC signaling. It may be useful to provide techniques for beam management that can handle scenarios in which all PDSCHs scheduled by a DCI have scheduling offsets that are less than the timeDurationForQCL parameter, and also can handle scenarios in which some or all PDSCHs scheduled by a DCI have scheduling offsets that are equal to or greater than the timeDurationForQCL parameter. FIG. 6 illustrates aspects of both such exemplary possible scenarios, according to some embodiments.

Figure 7:
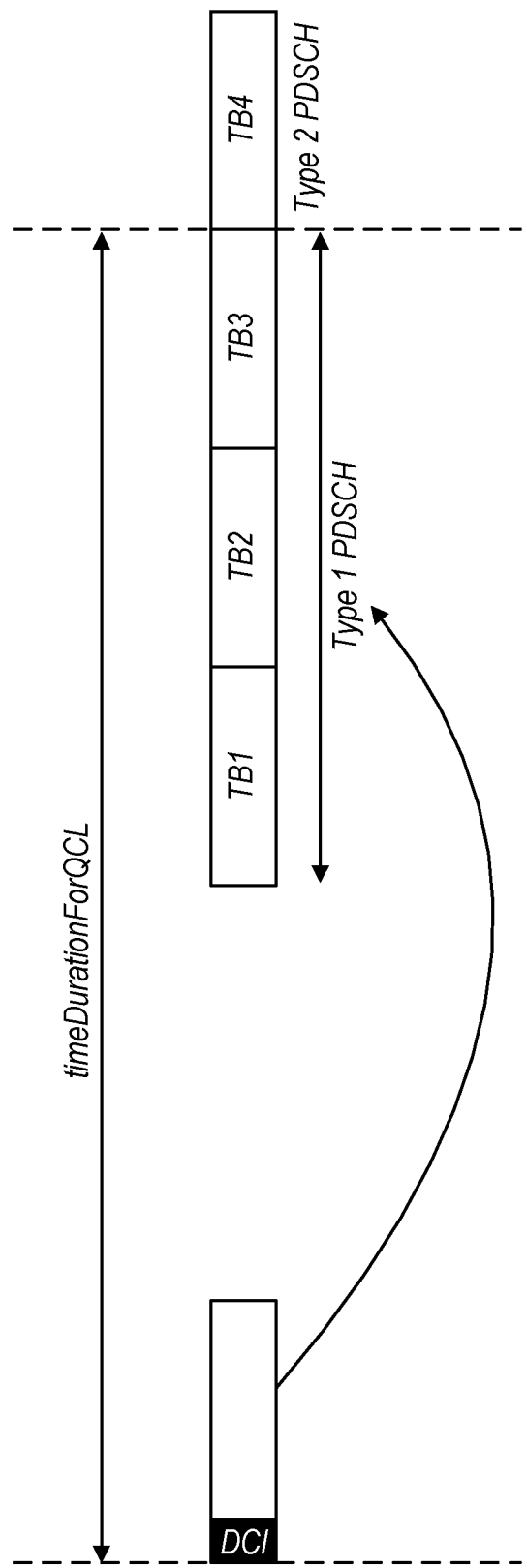

A DCI that schedules multiple PDSCHs or multiple PUSCHs may also be referred to herein as a M-DCI. In consideration of the previously described scenarios, it may be possible to categorize PDSCHs scheduled by a M-DCI into multiple types. For example, a 'type 1 PDSCH' may refer to a PDSCH for which the time offset between the M-DCI and the PDSCH is less than the threshold timeDurationForQCL, while a 'type 2 PDSCH' may refer to a PDSCH for which the time offset between the M-DCI and the PDSCH is equal to or greater than the threshold timeDurationForQCL. FIG. 7 illustrates exemplary aspects of such a categorization scheme. Note that a similar categorization scheme may be used for categorizing PUSCHs scheduled by a M-DCI into multiple types, if desired.

Figure 8:
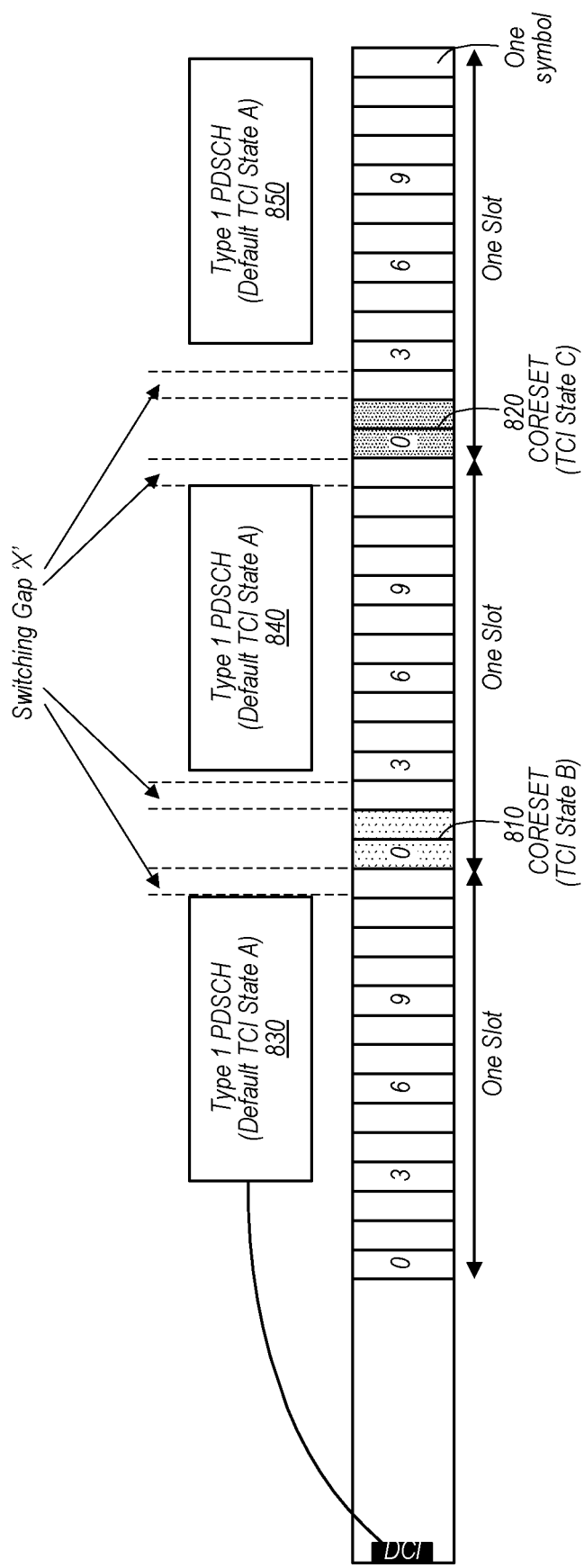
FIGS. 8-9 illustrates exemplary aspects of various possible approaches to performing transmission control indicator selection in a scenario in which multiple downlink transmissions are scheduled using a single downlink control transmission, according to some embodiments.

There may be multiple possible approaches to determining the QCL information for PDSCH transmissions in a multi-PDSCH scheduling configuration. One possible approach to determining the QCL information for type 1 PDSCHs, which may be introduced for larger sub carrier spacings (SCSs), such as 480 kHz SCS or 960 kHz SCS, may include the network explicitly configuring (e.g., via higher layer signaling such as dedicated RRC signaling) a TCI state on a per component carrier (CC) per bandwidth part (BWP) basis to be applied for type 1 PDSCH reception. Such an approach may be beneficial in allowing a gNB to select the best beam for the type 1 PDSCHs based on the latest beam reporting, e.g., regardless of the TCI states of overlapped control resource sets (CORESETs), at least according to some embodiments. However, it may still be the case that the UE is required to monitor all PDCCH candidates in all configured CORESET(s) in such a scenario, even if the corresponding TCI state(s) is (are) different than the default TCI state configured by higher layers. Exemplary aspects of such an approach are illustrated in FIG. 8. As shown, at least in some instances, switching gaps may be introduced and applied when the TCI state of one or more type 1 PDSCHs is different than that of a CORESET associated with subsequent PDCCH monitoring occasions (MOs). As one possibility, a common switching gap may be defined (e.g., in a SCS agnostic manner), for example as a parameter Tc, and applied for all SCSs for a given frequency band. As another possibility, different switching gaps (X) may be defined (e.g., in units of symbols) for different SCS. Such different switching gaps may be selected based at least in part on different symbol durations being used for different SCS configurations, e.g., such that larger switching gaps may be configured for SCS configurations with shorter symbol durations, to allow sufficient time for the UE to perform beam switching. For example, as one possibility, values of X=0 for 120 kHz SCS, X=1 for 480 kHz SCS, and X=2 for 960 kHz SCS could be used; other values are also possible.

It may be the case that a UE is not expected to transmit or receive within the switching gap before $T_0$-X, wherein $T_0$ is the start time of the first symbol of the CORESET associated with a PDCCH MO. As another possibility, any PDSCH symbols that are overlapped with switching gap(s) may be omitted or punctured by the UE in favor of performing beam switching to monitor the PDCCH on the corresponding CORESET(s).

As shown in the example scenario illustrated in FIG. 8, a single default TCI state A, which may be configured by higher layer signaling, may be applied to all of the type 1 PDSCH transmissions 830, 840, 850. Switching gaps with length X=1 may be applied before and after CORESET 810, 820 transmissions due to the different TCI states (i.e., TCI state B and TCI state C respectively) configured for those CORESET transmissions compared to the default TCI state A used for the type 1 PDSCHs.

Another approach may include providing a framework whereby it is possible to determine a default TCI state without need of explicit configuration, e.g., instead of explicitly configuring a default TCI state for type 1 PDSCH transmissions within a multi-PDSCH block of transmissions scheduled by a M-DCI transmission. As one such possibility, one preferred beam configuration (e.g., spatial QCL assumption) may be included in a UE's beam reporting, which may then implicitly be used by the gNB and the UE as the default TCI state for type 1 PDSCH transmissions. As another such possibility, the TCI state with the lowest index in the TCI states list configured by RRC signaling may be used by a UE as the default downlink reception beam for type 1 PDSCH transmissions. As a further possibility, the TCI state of the CORESET associated with a monitored search space with the lowest controlResourceSetId in the latest slot in which one or more CORESETs within the active BWP of the serving cell are monitored by a UE may be used as the default TCI state for type 1 PDSCH transmissions to the UE. Note that in such a case, it may be possible that a switching gap (for beam switching) is applied only before the CORESET in case of different TCI states being configured between a type 1 PDSCH and a subsequent PDCCH MO, e.g., since the UE may be able to continue using its current beam configuration if one or more further type 1 PDSCH transmissions are scheduled for after the PDCCH MO.

As a further possible approach, DCI based TCI state determination for type 1 PDSCH transmissions may be used for multi-PDSCH scheduling scenarios. For example, the latest TCI state signaled by the most recent M-DCI that schedules previous multi-PDSCH reception may be used as the default TCI for subsequent type 1 PDSCH reception. As another example, if the most recent previous M-DCI with HARQ-ACK feedback is received within M slots before the M-DCI that schedules type 1 PDSCH transmissions, the TCI state indicated by that most recent previous M-DCI may be used; otherwise, a default DCI state configured by RRC or implicitly determined (e.g., using one of the techniques described previously herein, among various possibilities) may be applied. Note that a previous M-DCI may be considered valid if the gap between HARQ-ACK feedback associated with the previous multi-PDSCH transmission scheduled by the previous M-DCI and the current M-DCI that schedules the current type 1 multi-PDSCH transmission is equal to or larger than a certain threshold ("N" symbols). The values of either or both of M or N may be reported as part of UE capability, configured by RRC or other signaling, specified in 3GPP standards documents, or may be determined in any of various other possible ways.

Figure 9:
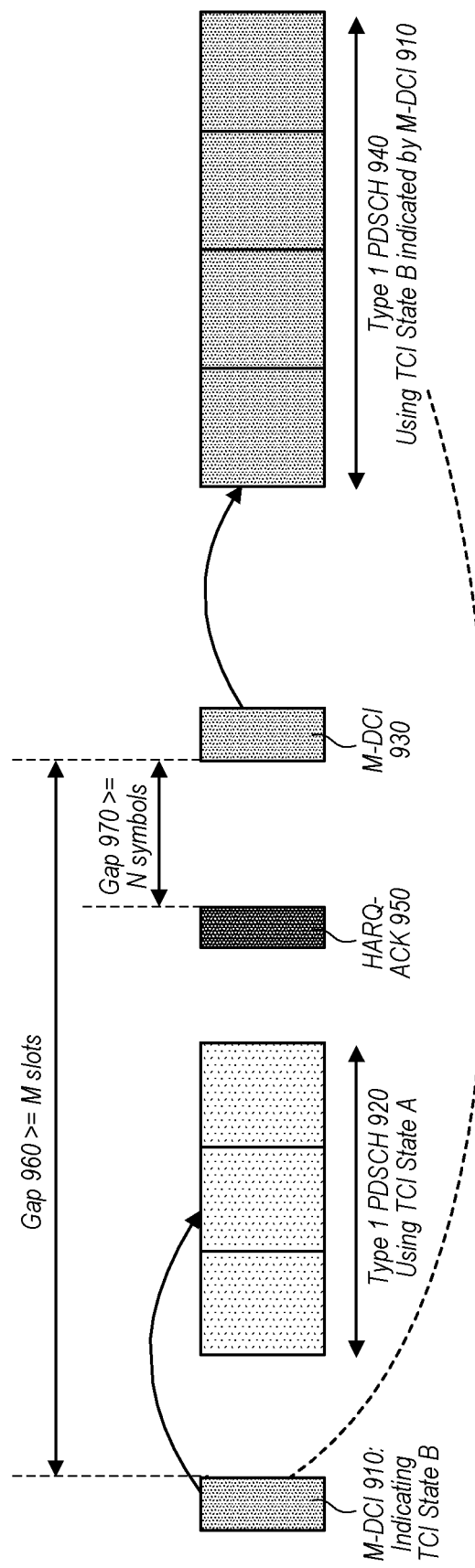

FIG. 9 illustrates exemplary possible aspects of such an approach. In the illustrated scenario, it may be assumed that a UE is provided a default TCI state A by RRC signaling or by any of various possible techniques for implicitly determining a default TCI state for type 1 multi-PDSCH transmissions. The UE may be scheduled with 3 type 1 PDSCHs 920 by M-DCI 910. The M-DCI 910 may indicate to use TCI state B for subsequent multi-PDSCH transmissions. Since there is no previous DCI transmission, the UE may apply TCI state 1 for the type 1 PDSCHs 920 and may feedback HARQ-ACK 950 correspondingly. The UE may continue monitoring the PDCCH to receive M-DCI 930, which may schedule 4 type 1 PDSCHs 940. The gap 970 between the HARQ-ACK 950 associated with the PDSCH 920 that is scheduled by the previous M-DCI 910 and the PDCCH for M-DCI 930 may be equal to or larger than the threshold N. The gap 960 between the detected M-DCI 910 and the MO for M-DCI 930 may be equal to or larger than the threshold M. Accordingly, the TCI state B indicated by the previous M-DCI 910 may be applied for the type 1 PDSCH reception 940 scheduled by the M-DCI 930.

A still further possible approach may include the use of RRC signaling to configure possible default TCI states for type 1 multi-PDSCH transmissions, in combination with use of lower layer signaling for fast updating of the actual default TCI state for type 1 multi-PDSCH transmissions. For example, a list of TCI states may be configured by RRC signaling to construct a default TCI-state list that can subsequently be used for default TCI state updating purpose. TCI states may be added or removed using the following RRC signaling:

default-tci-StatesToAddModList SEQUENCE (SIZE (1..maxNrofDefualtTCI-States)) OF TCI-State
default-tci-StatesToReleaseList SEQUENCE (SIZE (1..maxNrofDefualtTCI-States)) OF TCI-StateId FIG. 10 illustrates a table representing one possible example of a default-TCI-State list that could be constructed by such RRC signaling, e.g., assuming maxNrofDefaultTCI-States is equal to 2.

As one possibility for the lower layer signaling that could be used to update the default TCI, a new 'default TCI update'MAC CE could be introduced (e.g., in 3GPP Release 17), which may be identified by a MAC sub-header with a dedicated LCID that could be defined in 3GPP technical specifications. FIG. 11 illustrates exemplary aspects of a MAC CE that could include such signaling. A default TCI-ID field or information element of the MAC CE may indicate one TCI state in the TCI state list configured for PDSCH or dedicated default-tci-StateToAddModList for type 1 PDSCH reception. Upon reception of a default TCI-ID update MAC CE in slot n, the corresponding default TCI-ID for type 1 PDSCH may apply from the beginning of downlink slot n+k+1, where k may be selected to provide sufficient time for beam switching to the new default TCI state for type 1 PDSCH. The parameter k could be reported as part of UE capability information, configured by the network, or fixed for all UEs in 3GPP technical specifications, among various possibilities.

As another possibility for the lower layer signaling that could be used to update the default TCI, a new group-common DCI format may be introduced to update the default TCI state for type 1 PDSCH, e.g., to reduce overhead. According to some embodiments, the new DCI format may include an indication of default TCI-state (DTS) 1, DTS 2, . . . , DTS n, with CRC scrambled by dedicated TCI-RNTI. A UE may be provided by higher layer signaling the means to determine the index to the DTS numbers for a serving cell. It may be the case that the number of information bits in the new format may be equal to or less than the payload size of format 1_0 monitored in common search space (CSS) of the same serving cell. If the number of information bits in the new format is less than the payload size of format 1_0 monitored in CSS in the same serving cell, it may be the case that zeros are appended until the payload size is equal to that of format 1_0 monitored in CSS in the same serving cell.

Figure 12:
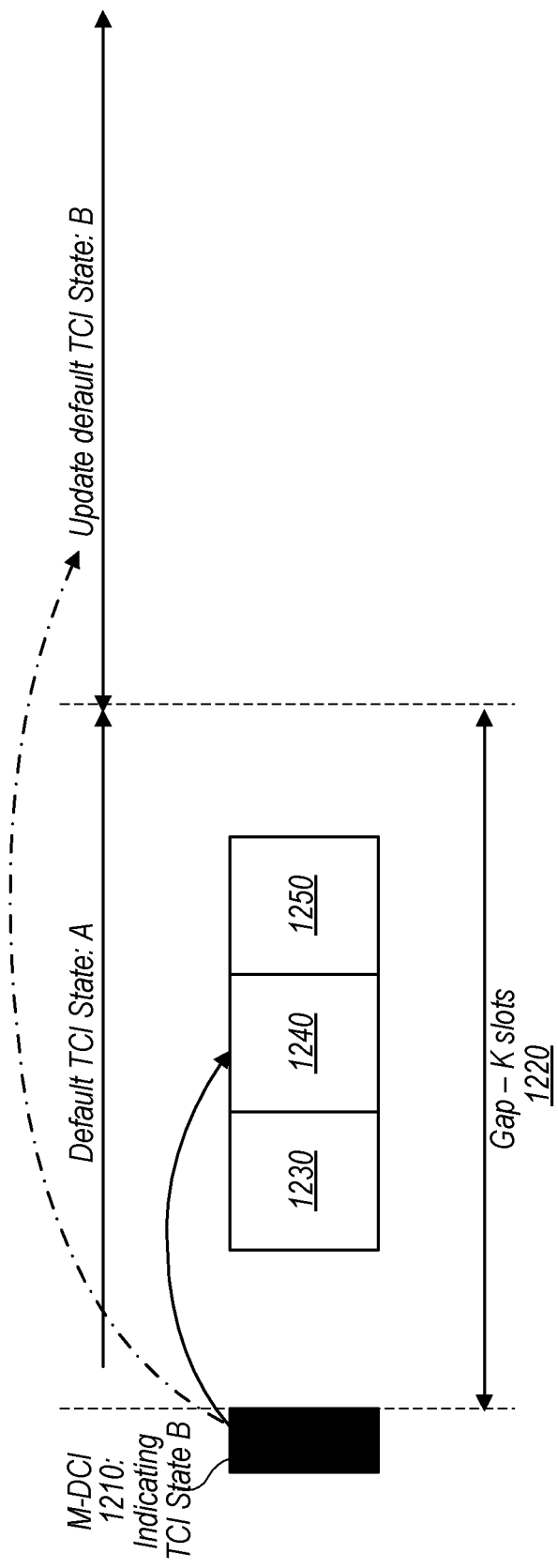
FIG. 12 illustrates exemplary aspects of another possible technique for signaling a default transmission control indicator for downlink transmissions in a scenario in which multiple downlink transmissions can be scheduled using a single downlink control transmission, according to some embodiments.

As another possibility for the lower layer signaling that could be used to update the default TCI, the new default TCI-state may be provided in a dedicated field/information element of the DCI format used for scheduling multi-PDSCH transmissions. Note that one code state of the dedicated field (e.g., all 0s, as one possibility) may be reserved to indicated no change of default TCI state. Upon reception of a DCI format with an updated TCI-ID in slot n, the associated new TCI-ID for type 1 PDSCH may be applied from the beginning of downlink slot n+k+1, where k may be selected to provide sufficient time for beam switching to the new default TCI state for type 1 PDSCH. The parameter k could be reported as part of UE capability information, configured by the network, or fixed for all UEs in 3GPP technical specifications, among various possibilities. FIG. 12 illustrates one possible example of default TCI updating using such a framework. As shown, in the illustrated scenario, the default TCI state was updated from TCI state A to TCI state B using M-DCI 1210, which may be applied after the configured gap 1220. Since the type 1 PDSCHs 1230, 1240, 1250 are scheduled earlier in time than the TCI state update takes effect, the UE may use the default TCI state A to receive those PDSCH transmissions.

As noted herein in accordance with various possible embodiments, in some instances a UE may be configured to use a different TCI state for type 1 multi-PDSCH transmissions than for PDCCH monitoring occasions that occur between at least some of the scheduled PDSCH instances. To potentially avoid the need to switch TCI states for those PDCCH monitoring occasions, it may be possible to provide a mechanism for canceling the PDCCH monitoring associated with CORESETs that are overlapped with PDSCHs scheduled by M-DCI and that are configured with different TCI states than that of the scheduled PDSCHs. For instances, a new 1 bit 'cancelation indicator' (CI) field may be defined and included in a M-DCI transmission to indicate whether to cancel the monitoring of such overlapped MOs (e.g. using CI=0, as one possibility) or to continue monitoring such overlapped MOs (e.g., using CI=1, as one possibility).

Figure 13:
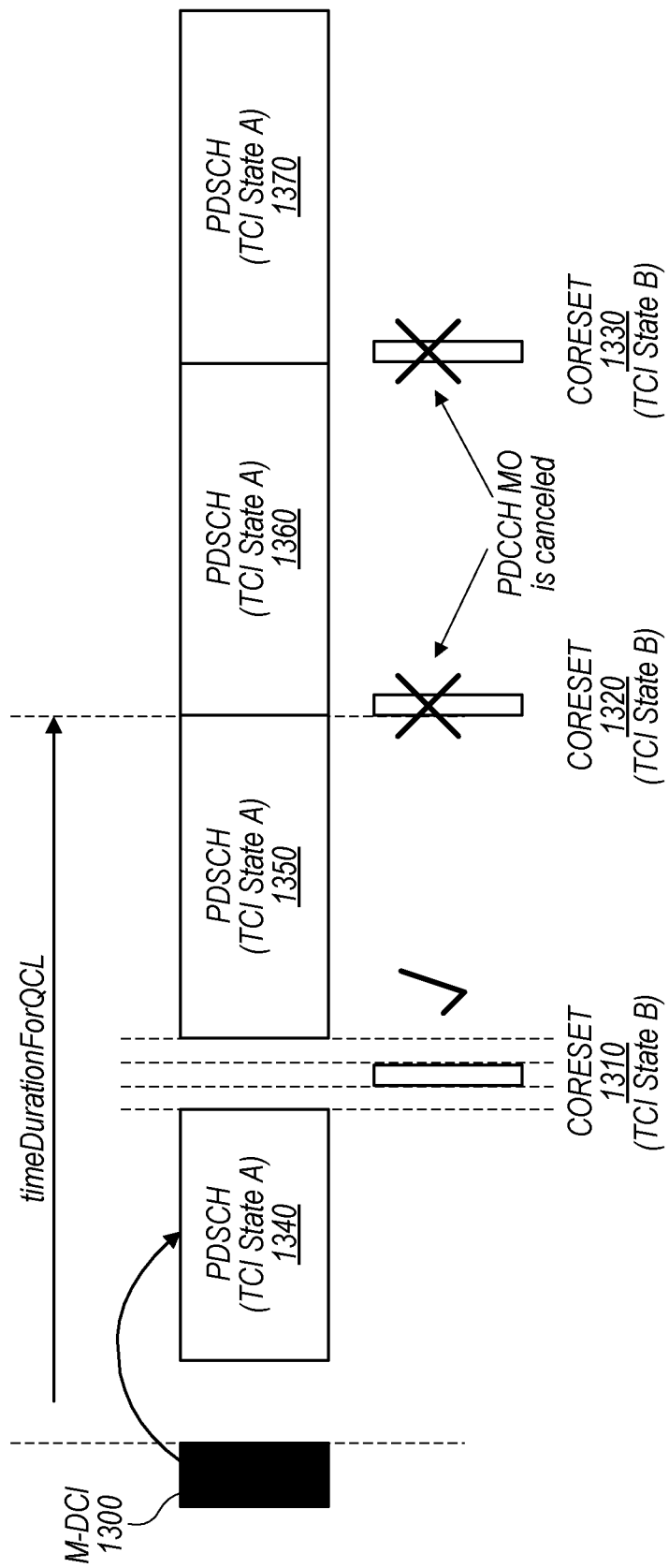
FIG. 13 illustrates exemplary aspects of a possible technique for canceling certain control signal monitoring occasions in a scenario in which multiple downlink transmissions can be scheduled using a single downlink control transmission, according to some embodiments.

In some instances, for DCI received in slot n, it may be the case that the corresponding CI is applied starting from the beginning of the next downlink symbol after n+δ symbols, wherein the parameter δ could be reported as part of UE capability information, configured by the network, or fixed for all UEs in 3GPP technical specifications, among various possibilities. This may allow the gNB to keep a UE using a single beam during most or all of a multi-PDSCH transmission without need for beam switching, which may improve resource use efficiency. FIG. 13 illustrates exemplary possible aspects of a scenario in which such a technique is applied. As shown, in the illustrated scenario, PDSCHs 1340, 1350, 1360, 1370 are scheduled by a single M-DCI 1300, with TCI state A having been determined (e.g., using any of the various possible techniques described herein) as the TCI state for the PDSCHs 1340, 1350, 1360, 1370. In the illustrated scenario, there are 3 PDCCH MOs 1310, 1320, 1330 with TCI state B overlapped with the PDSCHs 1340, 1350, 1360, 1370. The M-DCI 1300 may indicate CI=0 to cancel overlapping PDCCH MOs. Consequently, as shown, the UE may monitor MO 1310 (e.g., because it may occur prior to the configured application of the CI), but may cancel MOs 1320, 1330. Thus, the UE may be able to avoid beam switching for MOs 1320, 1330, and the resources that would otherwise have been unavailable during the beam switching and PDCCH monitoring may be used for the PDSCH transmissions.

Another possible aspect of NR operation, up to 71 GHz and otherwise, for licensed and/or unlicensed operation, may include supporting multi-slot span PDCCH monitoring. Multi-slot span PDCCH monitoring may be particularly beneficial in scenarios in which OFDM symbol duration is relatively short, such as for large SCS scenarios, at least in some instances. For example, the OFDM symbol duration at 960 kHz SCS may be 8 times shorter than at 120 kHz SCS. Multi-slot PDCCH monitoring may reduce the periodicity of PDCCH monitoring at a UE, and may allow more time for the UE to process the PDCCH candidates, though potentially at a cost of scheduling flexibility and latency. Since scheduling flexibility and latency may also be very important in at least some scenarios (e.g., for ultra reliable low latency communication (URLLC) traffic), in some instances it may be beneficial to support multi-slot monitoring as well as single-slot monitoring, and/or to provide other techniques to compensate for the potential lack of scheduling flexibility of multi-slot monitoring configurations with at least some additional scheduling flexibility support.

Accordingly, various possible techniques for efficiently managing/switching between multi-slot PDCCH monitoring and single-slot PDCCH monitoring, in particular in conjunction with multi-slot PDSCH scheduling techniques, are described herein.

According to some embodiments, a UE configured with multi-slot PDSCH scheduling may also be configured with search space sets with different PDCCH monitoring periodicities $P_i$, e.g., potentially including $P_0=1$ (single slot PDCCH monitoring) and $P_1>1$ (multi-slot PDCCH monitoring) as possible configurations. A variety of approaches to reducing the number of PDCCH MOs at the UE to balance the potential tradeoff between scheduling latency and power consumption may be possible.

As one possibility, a field may be included in the DCI format that schedules multiple PDSCH transmissions (e.g., M-DCI), which may be a 1 bit skipping indication. The field may be a flag that is used to indicate whether all or a subset of the PDCCH MOs within a window can be skipped (e.g., if the flag is set to 0, as one possibility), or no PDCCH MOs within the window should be skipped (e.g., if the flag is set to 1, as one possibility). If the flag value is used to indicate to skip a subset of the PDCCH MOs within the window, there may further be several possibilities for determining which subset of the PDCCH MOs to skip. As one possibility, the subset of the PDCCH MOs could include all MOs except those MOs that are configured with DCI formats that are used for the scheduling of PUSCH or CSS. This may also provide flexibility for a gNB to use the fallback DCI format to schedule latency-sensitive packets in the CSS, if desired. As another possibility, the subset of the PDCCH MOs could include all MOs except the last N PDCCH MOs of the window, where N can be configured by the network or defined in 3GPP technical specifications, among various possibilities. For example, N=1, N=2, or any of various other values of N may be used, according to various possible design frameworks.

The window to which the skipping indication applies may be defined or determined in any of various possible ways. As one possibility, the start of the window may be defined as the first symbol or the first slot/sub-slot (e.g., depending on the desired granularity) that is at least Δ symbols after the last symbol of the PDCCH with the M-DCI that includes the skipping indication. The value of Δ may be reported as part of UE capability information, configured by the network, or fixed for all UEs in 3GPP technical specifications, among various possibilities, and may be selected such as to allow the UE sufficient time to process the M-DCI and apply the potential MO skipping operations.

In some instances, the window may be configured to end at the last symbol of the last PDSCH in the set of multiple PDSCHs scheduled by the M-DCI. As another possibility, the window length (WL) may be determined implicitly, for example as:

$$WL=\min(S_i) \text{ or}$$

$$WL=\max(S_i),$$

where $S_i$ is the number of start and length indicators (SLIVs) configured for each multi-PDSCH scheduling, by RRC signaling. As a still further possibility, the window length may be configured by higher layers, e.g., on a per UE basis. For example, the window length could be implemented by defining a timer with configurable length via RRC signaling. In some instances, the window length could further be updated by MAC CE by activating/selecting one from a set of values that are either configured by RRC signaling or implicitly determined (e.g., using one of the techniques described herein, or any of various other possible techniques). As yet another possibility, the window may end at the first symbol of the next PDCCH MO of the search space set in which the UE detects the M-DCI. As still another possibility, the window length may be signaled as part of the M-DCI payload, e.g., by pointing to one of multiple possible values that can be configured by RRC signaling. Note that it may also be possible to combine multiple such possibilities, in some instances; for example, the possible window lengths configured by RRC could include one or more fixed values and/or one or more of the implicit techniques described herein. As one such possibility, a set of window lengths including <4,8, until the first symbol of the next PDCCH MO of the search space set of the M-DCI> could be configured by RRC signaling for a given UE. In such a scenario, a 2 bit skipping field of the M-DCI could be used to indicate one of these three values or a 'no skipping' option (e.g., using coding state 00).

Figure 14:
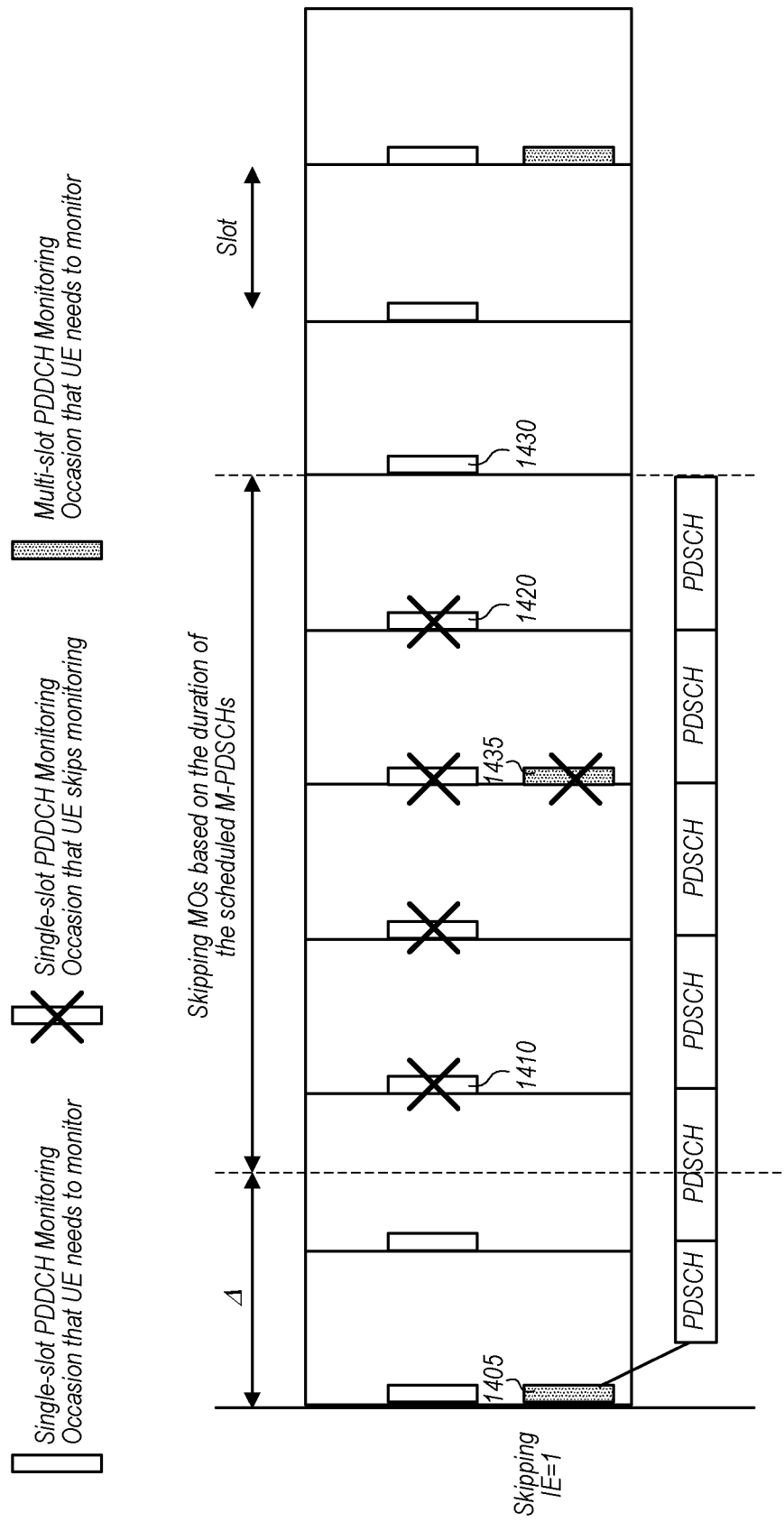
Figure 15:
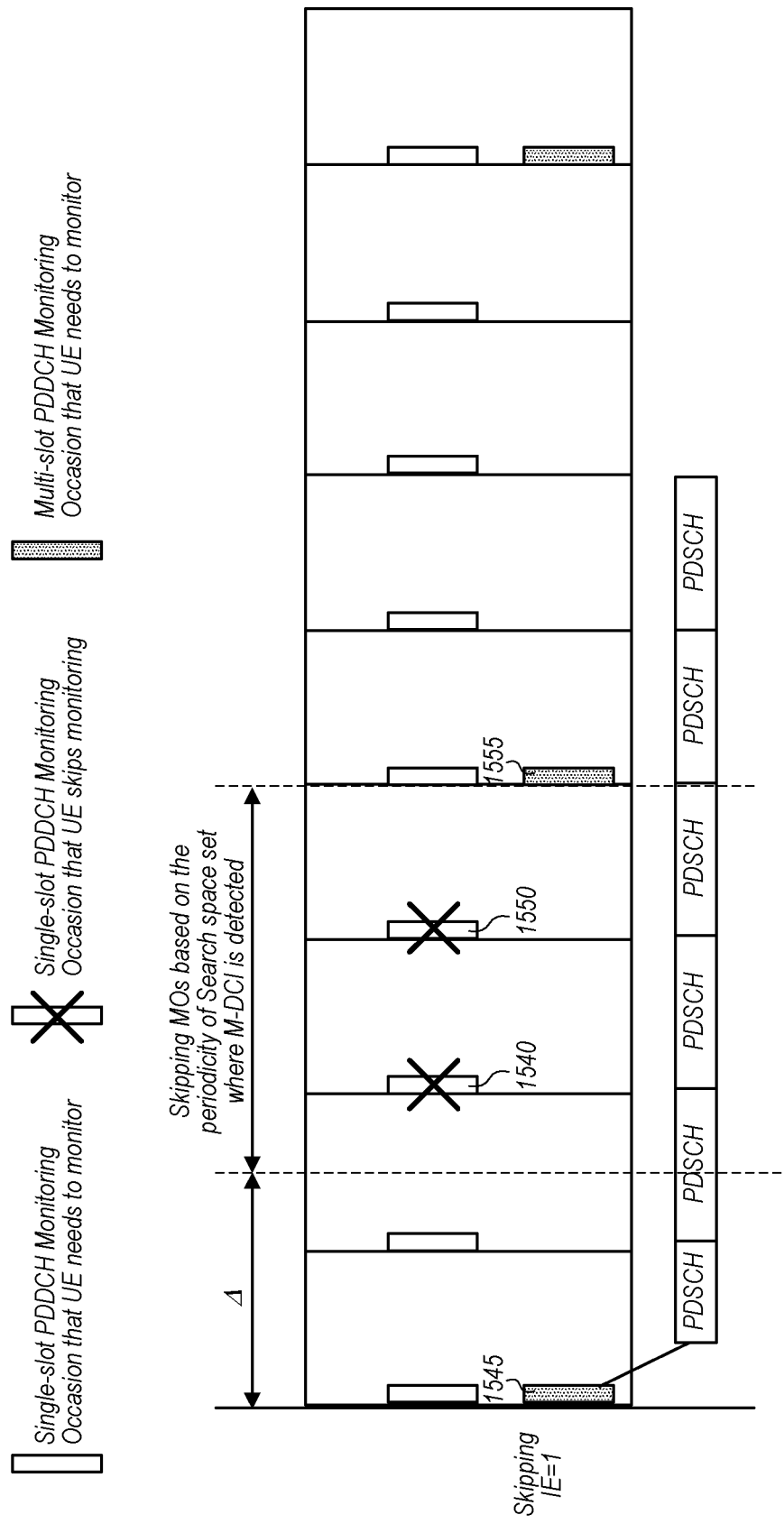
Figure 16:
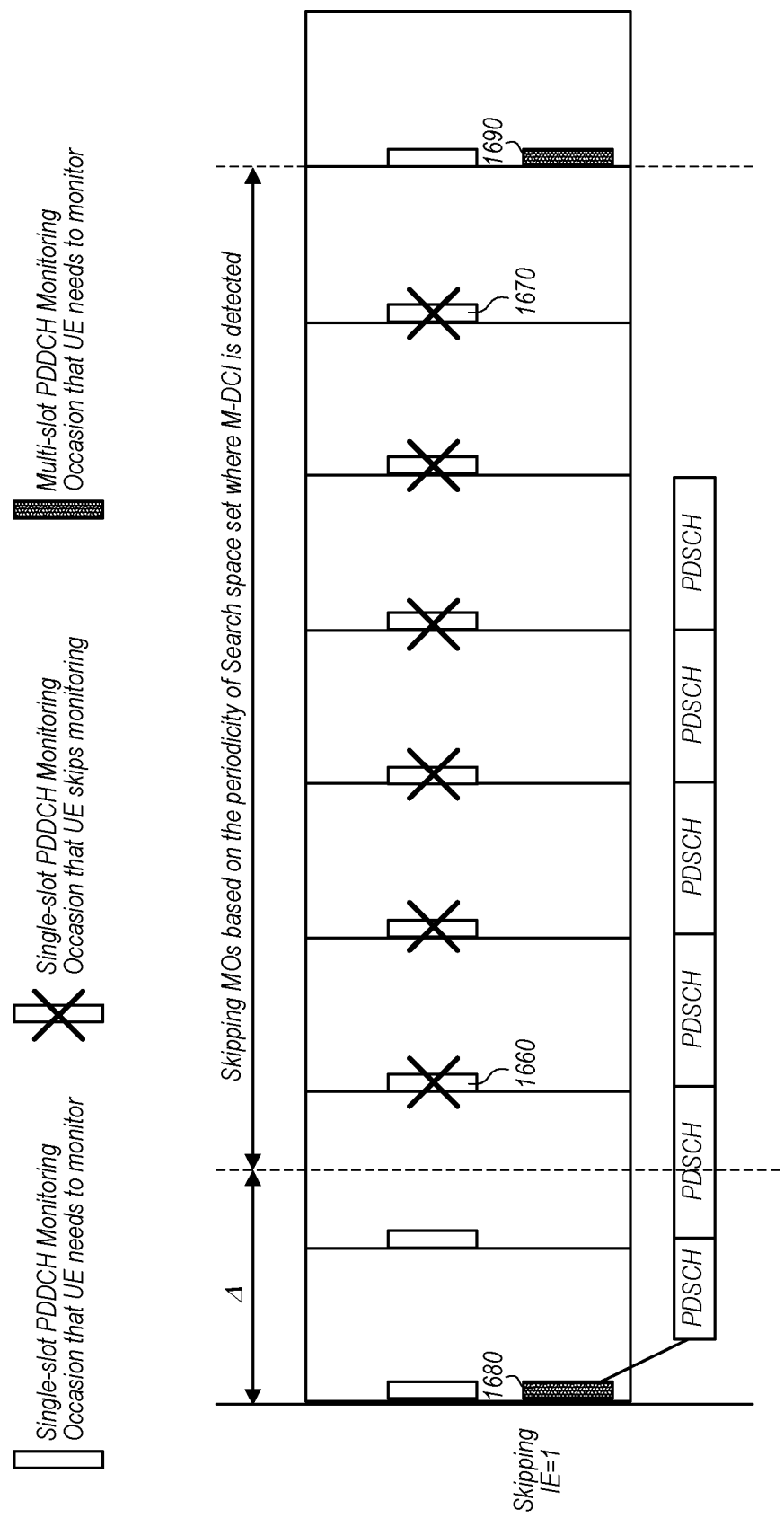

FIGS. 14-16 illustrate examples of various possible such schemes for skipping at least some PDCCH MOs in conjunction with multi-PDSCH scheduling operation. In the illustrated scenarios, it may be the case that a UE is configured with both single-slot and multi-slot PDCCH search spaces, with 4 (in FIGS. 14-15) and 8 (in FIG. 16) slots periodicity respectively for the multi-slot PDCCH MOs. In all of the illustrated scenarios, the M-DCI may include a skipping indication value set to indicate to the UE to skip at least a subset of the PDCCH MOs for the configured window, and the M-DCI may schedule 6 PDSCHs over six slots.

In FIG. 14, the window may be configured such that the skipping window ends at the last symbol of the last PDSCH scheduled by the M-DCI 1405. Correspondingly, the UE may skip the single slot MOs within the window that occur at least Δ after the M-DCI 1405 (e.g., starting from MO 1410, and ending with MO 1420. Note that the UE may or may not skip the MO 1435, e.g., depending on the configuration, as it may be a MO of the search space in which the UE detects the M-DCI 1405. The UE may resume PDCCH monitoring for MO 1430, e.g., as it may be subsequent to the configured skipping window.

In FIG. 15, the window may be configured such that the skipping window ends at the first symbol of the next PDCCH MO of the search space set in which the UE detects the M-DCI 1545. Accordingly, since P=4 for this MO, the UE skips two MOs 1540, 1550, and resumes PDCCH monitoring for MO 1555.

Similarly, in FIG. 16, the window may be configured such that the skipping window ends at the first symbol of the next PDCCH MO of the search space set in which the UE detects the M-DCI 1645. Accordingly, since P=8 for this MO, the UE skips MOs starting at MO 1660 and ending at MO 1670, and resumes PDCCH monitoring for MO 1690.

Note that such an approach may provide the network with the flexibility to select the search space with a certain periodicity, which in turn effectively controls which MOs are skipped by a UE, to potentially manage how scheduling latency and power saving gain are balanced, at least according to some embodiments.

Another approach to PDCCH monitoring may include only configuring multi-slot PDCCH monitoring for a UE. To mitigate latency concerns with such an approach, it may be possible to dynamically convey downlink control information as part of the multi-PDSCH payload that is scheduled by a M-DCI. Such downlink control information that is not carried by PDCCH may be referred to as virtual DCI (or V-DCI) herein, at least in some instances.

A variety of options for determining the PDSCH index(s) within multiple PDSCHs where V-DCI may potentially be transmitted. FIGS. 17-21 illustrate examples of various possible such schemes for providing dynamic V-DCI monitoring occasions in conjunction with multi-PDSCH scheduling operation.

Figure 17:
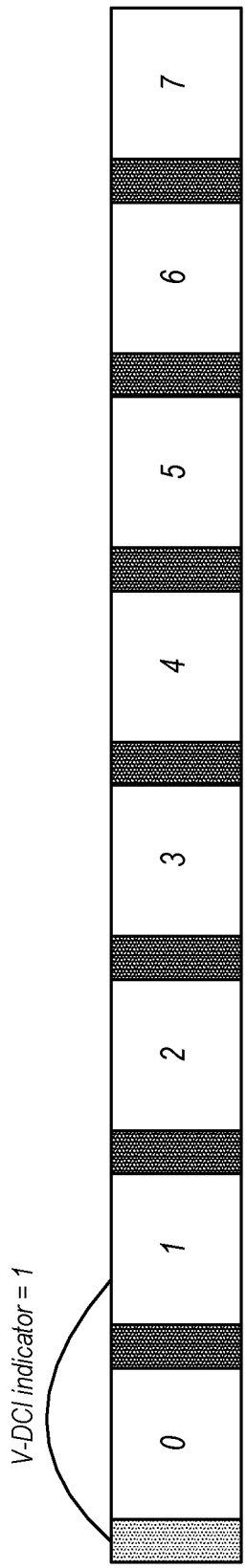

As one possibility, if enabled, the V-DCI may be present in every PDSCH scheduled by a single M-DCI, except the slot in which the M-DCI is detected. In such a scenario, the enabling or disabling of the V-DCI may be indicated by a 1 bit flag/information element in the M-DCI, e.g., using state '1' or '0' respectively. FIG. 17 illustrates such a scenario, e.g., in which the V-DCI is present in every scheduled PDSCH within the M-PDSCH.

Figure 18:
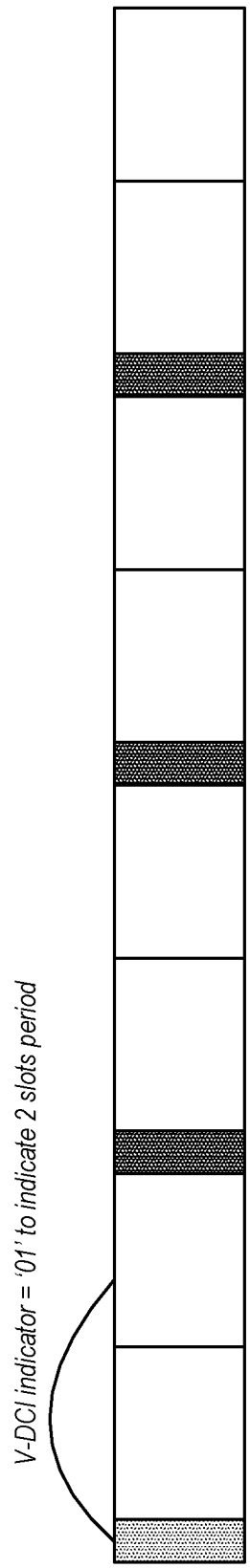

As another possibility, a list of periodic V-DCI monitoring configurations may be provided by RRC signaling, which may include multiple periodicity options. In some instances, a set of applicable values may be explicitly configured by RRC signaling in units of slots, e.g., <1,2,4,8>. FIG. 18 illustrates such a scenario, e.g., in which the V-DCI is located in PDSCHs #2, #4, and #6, by indicating P=2.

Figure 19:
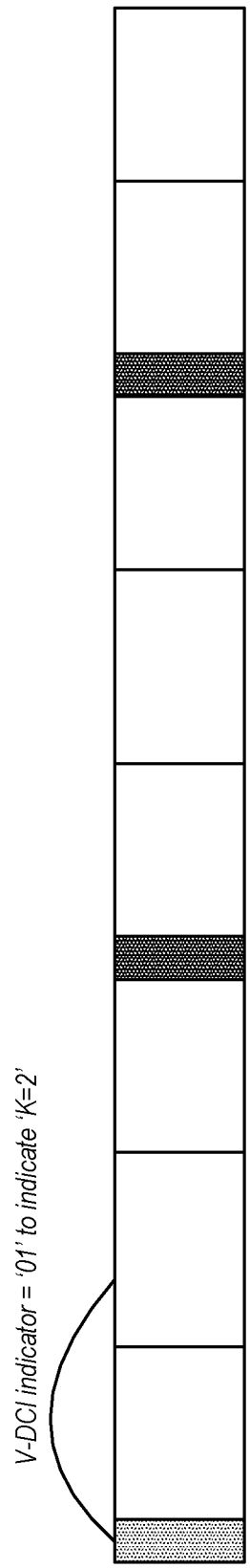

As a further possibility, a list of MO numbers K for V-DCI within a M-PDSCH may be configured by RRC signaling. In such scenarios, the V-DCI monitoring occasions may be determined implicitly using the following equation (except for the slot where the M-DCI is detected):

$$S = S_0 + i * \left\lceil \frac{M}{K+1} \right\rceil, i = 1, \ldots, K,$$

where M is the total number of PDSCHs within a given M-PDSCH transmission. The reference point S0 may represent the slot to apply the configured periocity, and may be configured as the slot in which the M-DCI is detected, or the first PDSCH within a M-PDSCH set scheduled by the M-DCI. FIG. 19 illustrates such a scenario, e.g., in which K=2 V-DCI occasions are configured within the M-PDSCH, and the UE is able to implicitly determine that those occasions occur in PDSCH #3 and #6 based on the configured equation.

As a further possibility, a set of MO patterns may be configured by RRC signaling using a bitmap based approach. One of these patterns (e.g., an index value associated with the selected pattern) may be dynamically signaled by the M-DCI using a dedicated field. For example, a 2 bit field could be used to dynamically indicate one MO pattern from 4 MO patterns configured by RRC signaling. In some instances, if the length of the signaled bitmap (B) is larger than the number of scheduled PDSCHs in the M-PDSCH (M), the bitmap may be truncated to the M most significant bits (MSBs) to determine the actual V-DCI MOs within the M-PDSCH. If the length of the bitmap is smaller than the number of scheduled PDSCHs in the M-PDSCH, the bitmap may be repeated to extend it to determine the actual V-DCI MOs within the M-PDSCH. The UE may use mod(M,B) MSB or least significant bits (LSB) for the last mod(M,B) PDSCHs within the M-PDSCH. Alternatively, the bitmap signaled in the M-DCI may be applied only for the last B slots or PDSCHs within the M-PDSCHs. In such a scenario, the UE may assume that no V-DCI is present in the other PDSCHs of the M-PDSCH.

FIG. 20 illustrates a scenario in which a bitmap '0000111' is indicated, such that the last three PDSCHs #5, #6, and #7 of the M-PDSCH may be used to carry V-DCI. Such an aperiodic MO configuration may be used to more provide more MOs towards the end of the M-PDSCH than towards the beginning of the M-PDSCH, at least in some instances. FIG. 21 illustrates a scenario in which a bitmap '0011' is indicated, based on which the PDSCHs #3, #4, and #7 may be used to carry V-DCI.

It may be useful to provide techniques for determining the DCI format and the corresponding payload size for PDSCH rate matching operation in conjunction with various of the embodiments described herein, such as for configuring V-DCI that is carried in a M-PDSCH scheduled by a M-DCI. As one such possible technique, a set of DCI format pairs for PUSCH and PDSCH scheduling may be configured by dedicated RRC signaling, or may be fixed/predefined in 3GPP specifications. An example table illustrating possible such DCI format pairs that could be predefined or configured via RRC is illustrated in FIG. 22. One DCI format pair may then be dynamically indicated by the M-DCI that schedules the M-PDSCH. As one option, a new field may be defined in M-DCI to indicate one DCI format pair from such a set of format pairs. As another option, the DCI format pair information may be indicated by the selection of a scrambling sequence [$\omega_0, \omega_1, \ldots, \omega_{23}$] to scramble the CRC bits of the M-DCI. FIG. 23 illustrates one such possible mapping between different scrambling sequences and DCI format pair indexes, which could be used in conjunction with the table of FIG. 22, among various possibilities. Note that at least in some instances, it may be understood that zero padding bits are to be appended for the DCI format in each pair (e.g., DCI 0_1 in pair 1 of the table illustrated in FIG. 22) that has a smaller payload size until the payload size is equal to the other DCI format in the same pair.

In some instances, separate channel codings may be applied for V-DCI and DL-SCH channels in the same PDSCH with separate CRC bits. As one example, polar code could be used for the V-DCI and low density parity code (LDPC) may be used for the DL-SCH. A variety of approaches may be possible for determining the number of coded symbols per layer for V-DCI transmission, denoted as $Q_{V-DCI}$, as follows.

As a first option, the UE may assume the V-DCI bits are QPSK modulated. The number of resource elements (RE) used for the V-DCI may be indicated in units of control channel elements (CCEs). The indication may be signaled by the associated M-DCI dynamically, e.g., by selecting one from a set of aggregation levels (ALs), which may either be configured by RRC signaling on a per UE basis or may be fixed/predefined in 3GPP specifications. Alternatively, one CCE aggregation level may be configured by RRC signaling. As another possibility, a new MAC CE may be defined to update the number of CCEs for the V-DCI. The V-DCI symbols sequence and modulated DL-SCH sequences may be concatenated sequentially starting from V-DCI symbols. Different alternatives may be considered for RE mapping of V-DCI symbols. As one possibility, the concatenated symbols sequence may be mapped to the allocated REs that are not reserved for other purposes in increasing order of frequency-first and time-second. As another possibility, a 1 bit flag field may be included in the M-DCI to indicate whether the CCEs for the V-DCI are distributed over RBs at the edges of bandwidth allocated for PDSCH transmissions. As a still further possibility, a 1 bit flag field may indicate whether a (e.g., predefined or configured) 'interleaved' or 'non-interleaved' mapping is used for V-DCI transmission, e.g., by treating the BW of PDSCH as CORESET RBs and a fixed value or predefined value for CORESET duration.

Figure 24:
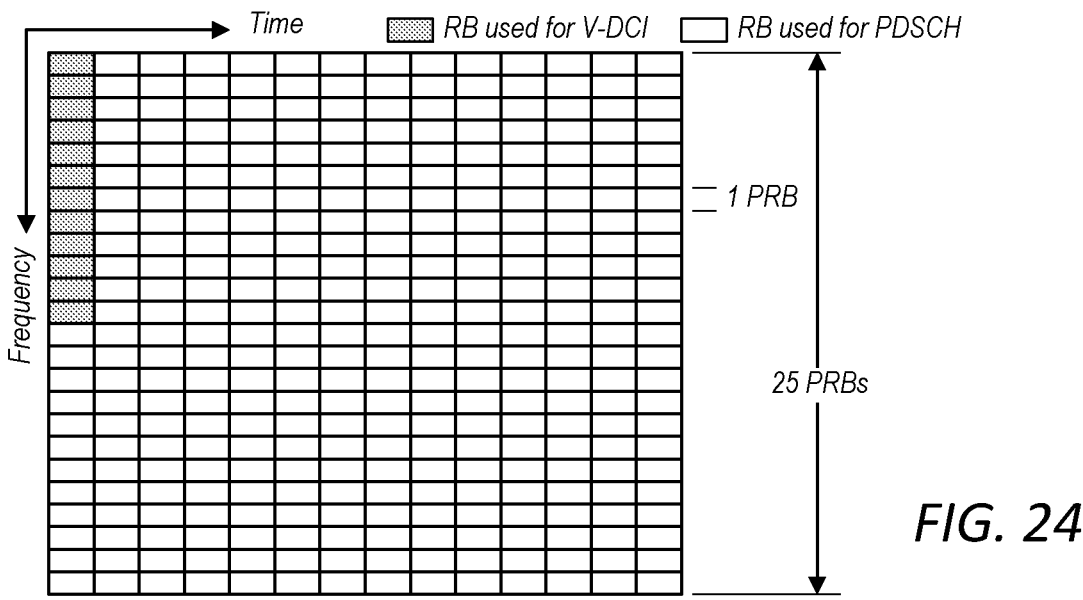
FIGS. 24-26 illustrate illustrates exemplary aspects of various possible techniques for providing downlink control information on a downlink shared channel in a scenario in which multiple downlink transmissions can be scheduled using a single downlink control transmission, according to some embodiments.
Figure 25:
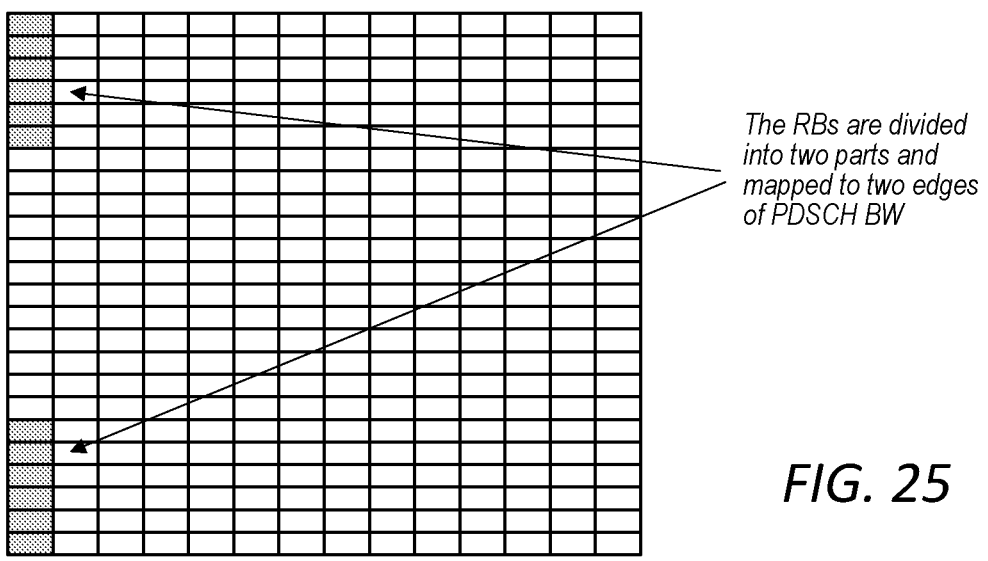
Figure 26:
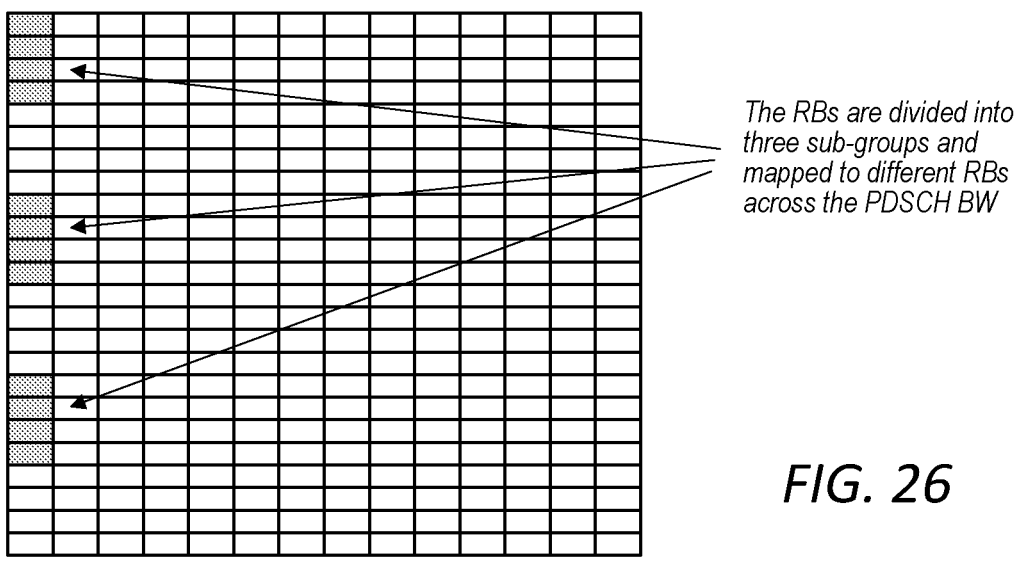

FIGS. 24-26 illustrate several possible approaches to V-DCI RE mapping, e.g., in accordance with the various options described herein. In the illustrated examples, it may be assumed that 25 PRBs are allocated for a given PDSCH within a M-PDSCH. In addition, it may be assumed that 2 CCEs are signaled by M-DCI for every V-DCI transmitted within the scheduled M-PDSCH. FIG. 24 illustrates a scenario in which 2 CCEs (12 PRBs) are sequentially mapped starting from the lowest PRB and the first symbol that is allocated for the PDSCH. FIG. 25 illustrates a scenario in which the 12 PRBs for the V-DCI are divided into two sub-groups with each having 6 PRBs and then mapped to edge RBs allocated to the PDSCH. FIG. 26 illustrates a scenario in which the 12 PRBs are divided into 3 sub-groups with each having 2 2-PRB bundles. In this scenario, REG bundle=2, interleaved parameter L=2, and interleaver size R=2 may be configured by RRC signaling. It may be the case that such an approach may improve V-DCI decoding performance, e.g., by exploiting frequency diversity gain across PRBs, for example in comparison to the scenario illustrated in FIG. 24, at least according to some embodiments.

According to some embodiments, instead of assuming the V-DCI bits are QPSK modulated, the modulation order signaled by M-DCI for the corresponding PDSCH may be used for the V-DCI. Considering potentially different block error rate (BLER) requirements for V-DCI and PDSCH channels, one scaling factor parameter may be introduced to determine the RE numbers used for V-DCI symbols. A set of values $\beta_i$, i=0,1 . . . for the scaling factor may be fixed or predefined in 3GPP specifications or configured by RRC signaling on a per UE basis. If the candidate values are fixed or predefined, one of the preconfigured $\beta_i$ values may be configured using RRC signaling. Alternatively, one value may be updated/selected by MAC CE signaling or dynamically selected by M-DCI, e.g., based on the latest channel conditions. The number of coded modulation symbols per layer $Q_{V-DCI}$ for V-DCI transmission may be determined as using the following equation:

$$Q_{V-DCI} = \min\left\{ \left\lceil \frac{\left(O_{V-DCI} \cdot \beta_{offset} \cdot \sum_{l=l_0}^{N_{symb}^{PDSCH}-1} M_{SC}^{V-DCI}(l)\right)}{\sum_{r=0}^{C_{DL-SCH}-1} K_r} \right\rceil, \left\lceil \alpha \cdot \sum_{l=l_0}^{N_{symb}^{PDSCH}-1} M_{SC}^{V-DCI}(l) \right\rceil \right\}$$

where:
$O_{V-DCI}$: the number of HARQ-ACK bits;
$C_{DL-SCH}$: the number of code blocks for DL-SCH of the PDSCH transmission;
$M_{SC}^{V-SCI}(l)$: the number of resource elements that can be used for transmission of V-DCI in OFDM symbol l;
$\alpha$: configured by higher layers, e.g., to manage spectral efficiency;
$N_{symb}^{PDSCH}$: the total number of OFDM symbols of the PDSCH, including all OFDM symbols used for DMRS; and
$l_0$: the symbol index of the first OFDM symbol that does not carry DMRS of the PDSCH, after the first DMRS symbol(s), in the PDSCH transmission.

One consideration when designing a framework for multi-PDSCH scheduling using a M-DCI may include how to handle HARQ-ACK feedback. In particular, since the number of scheduled PDSCHs on each CC may be dynamically varied based on the latest downlink buffer status on the network (e.g., gNB) side (e.g., to improve resource efficiency), the variable number of scheduled PDSCHs in the multi-PDSCH scheduling may be more susceptible to misalignment between the gNB and the UE regarding the HARQ-ACK payload size, e.g., in case a scheduling DCI is missed at the UE side. For multiple PDSCH scheduling operation, missing the 'last grant' may be a more significant problem (e.g., compared to single PDSCH scheduling). For single PDSCH scheduling, missing the last grant can be avoided with certain gNB implementations, e.g., using blind detection by assuming different HARQ-ACK codebook size (s) with increased receiver complexity. For multiple PDSCH scheduling and with multiple CCs, relying on gNB hypothetical detection would significantly increase receiver complexity (e.g., due to a potentially large number of hypotheses possible with the combination of the number of CCs and the number of scheduled PDSCHs per CC). Accordingly, it may be beneficial to provide improved techniques for robust HARQ-ACK feedback for M-PDSCH operation.

Figure 27:
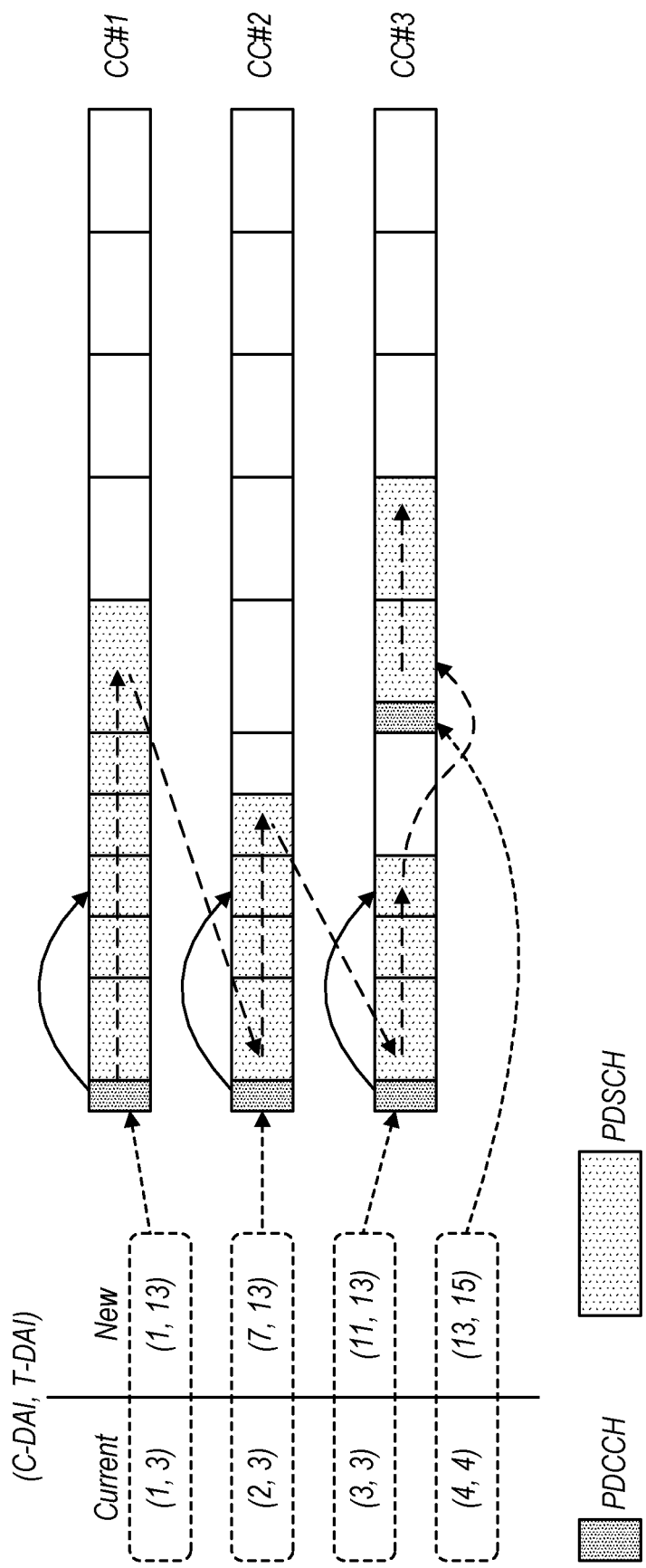
FIG. 27 illustrates exemplary aspects of possible downlink assignment index design for use in a scenario in which multiple downlink transmissions can be scheduled using a single downlink control transmission, according to some embodiments.

One such possible technique may include modifying the design used for downlink assignment index (DAI) fields, such as the counter DAI (C-DAI) and total DAI (T-DAI) fields used as part of HARQ-ACK operation. For example, as one possibility, the meaning of the C-DAI and T-DAI fields in at least some DCI formats may be redefined to denote the accumulative number and the total number of {serving cell, PDSCH occasion} pairs up to the first scheduled PDSCH of the current PDCCH monitoring occasion, e.g., instead of {serving cell, PDCCH occasion} pairs, as currently defined, at least according to some embodiments. FIG. 27 illustrates how such approaches may differ in one example scenario in which 3 CCs are configured. As shown, for CC #2, using existing definitions, the (C-DAI, T-DAI) may be set to (2,3), as the accumulative number of {serving cell, PDCCH occasion} pairs for CC #2 may be 2 and the total number of {serving cell, PDCCH occasion} pairs may be 3. In contrast, following the proposed definitions, the (C-DAI, T-DAI) may be set to (7,13), as the accumulative number of {serving cell, PDSCH occasion} pairs for CC #2 may be 7 (since 6 PDSCHs have been scheduled in the CC #1 and are thus accumulated for the C-DAI value for CC #2) and the total number of {serving cell, PDSCH occasion} pairs may be 13 (since 13 total PDSCH occasions are scheduled across CC #1, CC #2, and CC #3).

In order to indicate higher C-DAI/T-DAI values than 4, such as might occur in the illustrated scenario of FIG. 27, part of such a redesign may also include increasing the number of bits (e.g., from 2 to 'N') used to signal the C-DAI and/or T-DAI fields. Any of a variety of possible approaches may be used to determine the value of N.

As one possibility, the value of N may be determined based on the maximum number of PDSCHs that may be scheduled by a multi-TTI DCI format, i.e.:

$$N = f(N_{group,j}^{TB,max})$$

For example, the following function may be used, in some instances:

$$N = \log_2(N_{group,j}^{TB,max} * K),$$

where K=4 according to the current specification because of the 2 bit DAI field size. Thus, as one example, assuming:

$$N_{group,j}^{TB,max} = 8$$

then:

$$N = \log_2(8*4) = 5$$

Such an approach may achieve the same reliability level for HARQ-ACK code size, at the cost of increased DCI overhead, at least according to some embodiments.

As another possibility, the value of N may be separately configured by higher layers, e.g., broadcast in a system information block (SIB) or indicated using dedicated RRC signaling (e.g., independent of the maximum number of TBs that may be scheduled by a M-DCI).

As a still further possibility, the number of bits in 'extended' C-DAI and T-DAI fields such as described herein may be fixed in 3GPP specifications and applied for all UEs without the need for signaling.

In some instances, such a DAI design extension for improved HARQ-ACK reliability for M-PDSCH operation may be configurable, for example under the control of a gNB scheduler, e.g., on a per UE basis. For example, use of such a DAI design/size extension or fallback to legacy DAI design/sizes may be enabled or disabled by the gNB based on UE location, signal strength, and/or for any of various other reasons. As one such possibility, dynamic deactivation of such a feature may be used to reduce the downlink signaling overhead and HARQ-ACK payload for cell center UEs that may be less likely to need the additional robustness, and/or dynamic activation of such a feature may be used to minimize the uplink overhead and UE transmission power for cell edge UEs that may be more likely to need the additional robustness.

Note also that it may be possible that two separate field length values 'N1' and 'N2' may be applied for C-DAI and T-DAI field extensions respectively, e.g., considering their different functionalities. For example, it may be the case that a bit width extension is applied for only one of these two fields (e.g., N1=2 or N2=2), instead of both, to reduce the impact on the signaling overhead. As another possibility, the value of N1 and N2 may both be increased but to different values. For example, since the total DAI may be used to indicate the total number of PDSCHs scheduled across the CCS, T-DAI misalignment between the UE and the gNB may result in the gNB being unable to correctly decode the entire HARQ-ACK codebook such that all PDSCHs have to be transmitted. Accordingly, at least in some instances, it may be possible that a larger bit width increase is selected/applied for N2 than for NJ, e.g., such that N2>N1>2. As one example, N2=5 bits and N1=3 bits could be selected.

Figure 28:
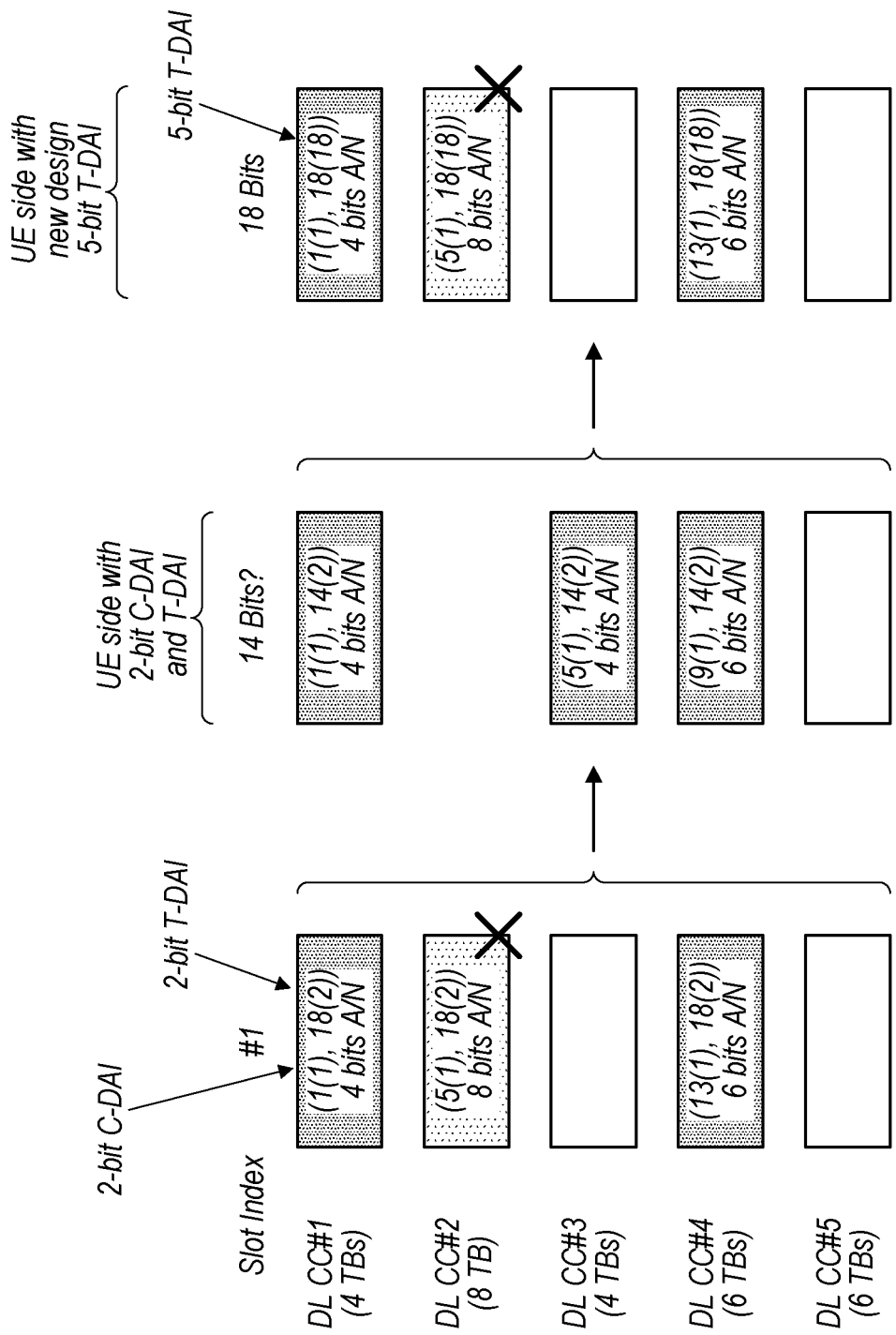
FIG. 28 illustrates exemplary aspects of a scenario in which such a downlink assignment index design may result in improved outcomes in comparison with existing dowlink assignment index design, according to some embodiments.

FIG. 28 illustrates aspects of an example scenario in which the existing DAI design framework may result in the HARQ-ACK codebook size being mis-matched between a UE and gNB but the extended DAI design framework described herein may avoid the possibility of such mismatching. As shown, in the illustrated scenario, 5 DL CCs may be configured, and the gNB may transmit 4 TBs on DL CC #1, 8 TBs on DL CC #2, and 6 TBs on DL CC #4. If the existing 2 bit DAI design is used, the UE could incorrectly determine that 4 TBs were provided on DL CC #3, or could come to another possible incorrect interpretation. In contrast, as shown, if the extended DAI design framework described herein is used, the UE may correctly determine the number of missing TBs as 8 and provide HARQ-ACK feedback using the correct HARQ-ACK codebook size.

According to some embodiments, it may be possible that a set of HARQ-ACK codebook sizes <$CB_0, CB_1, \ldots, CB_{k-1}$> may be determined for M-PDSCH HARQ-ACK feedback. The size of HARQ-ACK codebook for feedback may be selected as the minimum value from the predefined set that is larger than the total DAI detected at the UE side. There may be several options for configuring the possible codebook sizes.

As one such option, uniform quantization may be used to determine a codebook size set. For example, in one set of embodiments, $CB_i = i*\Delta$, where $\Delta$ denotes the quantization step of hARQ-ACK codebook size. There may further be multiple possible ways to determine the value of $\Delta$. For example, the value of A may be fixed in the 3GPP specifications, such that if $\Delta=8$, the HARQ-ACK codebook sizes would correspondingly be <8, 16, 24, 32, ... >. As another example, the value of A may be broadcast in SIB(s) for all UEs. As still another example, the value of $\Delta$ may be configured by dedicated RRC signaling on a per UE basis, e.g., to balance the possible tradeoff between UL HARQ-ACK feedback overhead and DL control signaling overhead (e.g., aggregation levels); for instance, a smaller A value could be configured for cell-center UEs with higher PDCCH detection probability, if desired. As yet another example, a set of A values could be configured on a per UE basis, and one of these A values could further by dynamically configured (e.g., through the scheduling DCIs) for HARQ-ACK feedback. Note that to ensure the reliability of $\Delta$ value detection in such a scenario, it may be the case that the UE assumes a same value of $\Delta$ in all DCI formats that associate a same PUCCH occasion for HARQ-ACK feedback (i.e., HARQ-ACK window). As a still further example, the value of $\Delta$ may be determined based at least in part on the maximum number of PDSCHs that may be scheduled by a M-DCI. For example, the value of Δ may be determined using the following equation, as one possibility:

$$\Delta = M^* N_{group,j}^{TB,max}$$

where M may be a parameter that is determined using any of the techniques just described herein for determining the value of Δ.

As another option, a non-uniform quantization may be used to determine a HARQ-ACK codebook size set. For example, larger quantization size(s) may be used when the HAR-ACK codebook size(s) exceed one or more thresholds.

One technique that may be used to potentially reduce the HARQ-ACK codebook size without increasing the downlink control signaling overhead may include dividing the (uniform or non-uniform) HARQ-ACK codebook sizes in the set of HARQ-ACK codebook sizes into two sub-groups, and determining from which sub-group to select the HARQ-ACK codebook size implicitly based on the DAI ordering direction.

Figure 29:
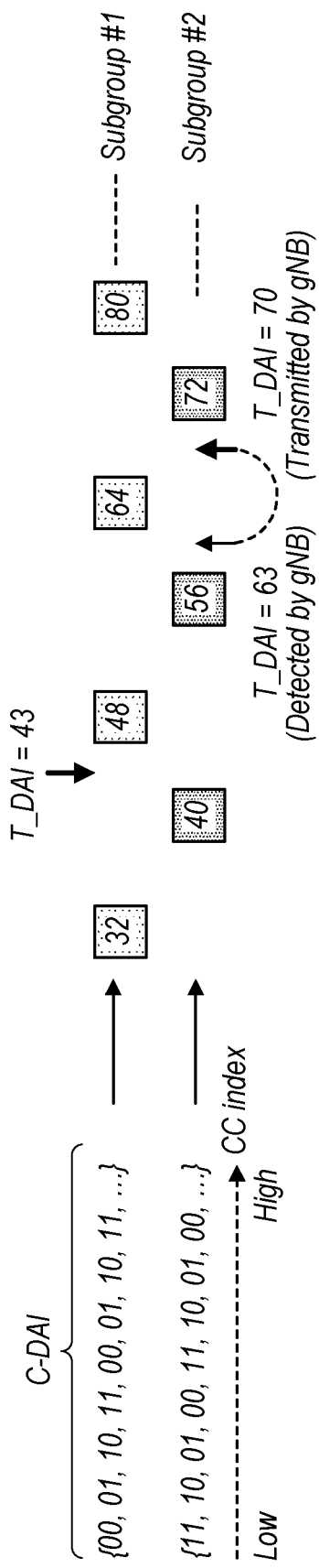

For example, as one possibility, if ascending C-DAI order (e.g., if C-DAI is ordered starting from the CC with the lowest index) is detected by a UE for a given PDCCH monitoring occasion, the UE may be configured to determine to select the HARQ-ACK codebook size from the first sub-group of HARQ-ACK codebook sizes, while if descending C-DAI order (e.g., if C-DAI is ordered starting from the CC with the highest index) is detected by a UE for a given PDCCH monitoring occasion, the UE may be configured to determine to select the HARQ-ACK codebook size from the second sub-group of HARQ-ACK codebook sizes. FIG. 29 illustrates one possible example scenario in which such an approach may be used, according to some embodiments. As shown, in the illustrated scenario, sub-group #1 may include <32, 48, 64, . . . > and subgroup #2 may include <40, 56, 72, . . . >.

As a first example, if the total number of scheduled PDSCHs is 43 (i.e., T-DAI=43), the gNB may use ascending C-DAI ordering across CCs, and correspondingly, the UE may determine the HARQ-ACK codebook size as the closest minimum value in subgroup #1 that is larger than detected T-DAI. Thus, 48 HARQ-ACK bits may be generated and provided as feedback to the gNB.

As a second example, if the total number of scheduled PDSCHs is 70 (i.e., T-DAI=70), the gNB may use descending C-DAI ordering across CCs, and correspondingly, the UE may determine the HARQ-ACK codebook size as the closest minimum value in subgroup #2 that is larger than detected T-DAI. Thus, 72 HARQ-ACK bits may be generated and provided as feedback to the gNB.

Note that in comparison with a non-subgrouping approach, the robustness of the HARQ-ACK codebook size may be enhanced using such a technique. For example, again assuming the gNB schedules 70 PDSCHs (i.e., T-DAI=70), but the last DCI format(s) with T-DAI=70 is missed by the UE and T-DAI=63 is detected by the UE, without sub-grouping, the UE would feedback 64 bits HARQ-ACK and misalignment problem would occur. However, with the sub-grouping approach, the total number of HARQ-ACK bits may be determined as 72, and the potential misalignment problem possible if sub-grouping is not used may be avoided.

Figure 30:
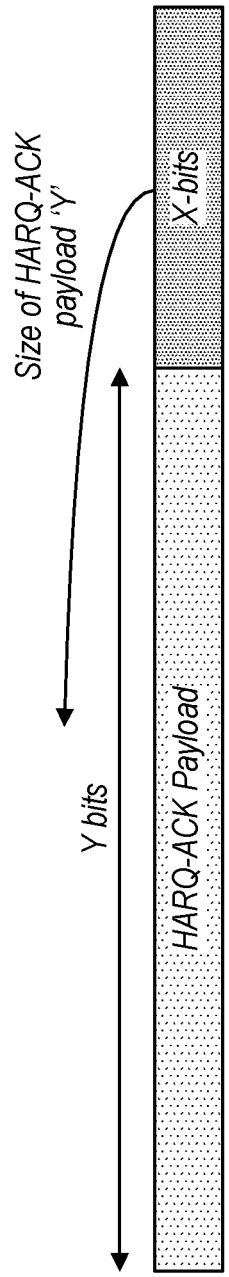

According to some embodiments, an indication of the HARQ-ACK codebook size may be provided by UEs when reporting HARQ-ACK bits. For example, as one possibility, the number of reported HARQ-ACK bits 'Y' may be appended to the end of the HARQ-ACK payload using X bits and sent from the UE to the gNB. FIG. 30 illustrates exemplary aspects of such a technique, according to some embodiments.

In some instances, a parameter K may be defined as $K=\mod(Y, 2^X)$, and the value of K may be appended at the end of the HARQ-ACK payload using X bits. Such an approach may reduce the additional overhead while still providing sufficient information for the gNB to determine the HARQ-ACK codebook size in most scenarios, at least according to some embodiments. FIG. 31 is a table illustrating one possible example mapping between K and Y assuming X=3, according to some embodiments.

As a further possibility, in some designs for PUCCH format 3, the value of Y may be implicitly signaled using the PUCCH DMRS cyclic shift. Note that CS=0 may be used for DMRS of PUCCH format 3 in current designs. There may be a total of 12 cyclic shifts available even with a single PRB PUCCH transmission. Thus, at least in some instances, at the UE side, the DMRS cyclic shift value to use may be determined based on the HARQ-ACK payload size Y. At the gNB side, the PUCCH DMRS cyclic shift may need to be detected (e.g., based on the correlation and energy detection) and then the gNB may perform PUCCH channel estimation and payload decoding. FIG. 32 is a table illustrating one possible example mapping between possible total HARQ-ACK bits (Y) and 6 DMRS cyclic shift values, according to some embodiments.

In the following further exemplary embodiments are provided.

One set of embodiments may include an apparatus, comprising: a processor configured to cause a wireless device to: establish a wireless link with a cellular base station; receive first downlink control information during a first control channel monitoring occasion, wherein the first downlink control information schedules multiple downlink transport blocks, wherein the first downlink control information includes an indication to skip one or more subsequent control channel monitoring occasions; and skipping one or more control channel monitoring occasions based at least in part on the indication to skip one or more subsequent control channel monitoring occasions.

According to some embodiments, the indication to skip one or more subsequent control channel monitoring occasions indicates to skip all control channel monitoring occasions within a configured time window.

According to some embodiments, the indication to skip one or more subsequent control channel monitoring occasions indicates to skip a subset of control channel monitoring occasions within a configured time window.

According to some embodiments, the indication to skip one or more subsequent control channel monitoring occasions is associated with a configured time window, wherein the configured time window begins a configured number of orthogonal frequency division multiplexing (OFDM) symbols after a last OFDM symbol of the first control channel monitoring occasion, wherein the configured window ends at a last OFDM symbol of the multiple downlink transport blocks scheduled by the first downlink control information.

According to some embodiments, the indication to skip one or more subsequent control channel monitoring occasions is associated with a configured time window, wherein the configured time window begins a configured number of orthogonal frequency division multiplexing (OFDM) symbols after a last OFDM symbol of the first control channel monitoring occasion, wherein the configured time window has a duration equal to a minimum or maximum total number of start and length indicators (SLIVs) configured for downlink transport blocks scheduled by the first downlink control information.

According to some embodiments, the indication to skip one or more subsequent control channel monitoring occasions is associated with a configured time window, wherein the configured time window begins a configured number of orthogonal frequency division multiplexing (OFDM) symbols after a last OFDM symbol of the first control channel monitoring occasion, wherein the processor is further configured to cause the wireless device to: receive information indicating a duration of the configured time window.

According to some embodiments, the indication to skip one or more subsequent control channel monitoring occasions is associated with a configured time window, wherein the configured time window begins a configured number of orthogonal frequency division multiplexing (OFDM) symbols after a last OFDM symbol of the first control channel monitoring occasion, wherein the configured window ends at a first OFDM symbol of a next control channel monitoring occasion of a same search space set as the first control channel monitoring occasion.

According to some embodiments, the indication to skip one or more subsequent control channel monitoring occasions is associated with a configured time window, wherein the configured time window begins a configured number of orthogonal frequency division multiplexing (OFDM) symbols after a last OFDM symbol of the first control channel monitoring occasion, wherein the processor is further configured to cause the wireless device to: receive information configuring a set of possible time window durations; and receive information indicating a duration selected from the configured set of possible time window durations in the first control information.

Another set of embodiments may include an apparatus, comprising: a processor configured to cause a wireless device to: establish a wireless link with a cellular base station; receive first downlink control information during a first control channel monitoring occasion, wherein the first downlink control information schedules multiple downlink transport blocks, determine that one or more portions of the downlink transport blocks scheduled by the first downlink control information are configured as virtual downlink control information monitoring opportunities; and monitor the determined one or more portions of the downlink transport blocks for virtual downlink control information.

According to some embodiments, the processor is further configured to cause the wireless device to: determine that a virtual downlink control information monitoring opportunity is present in each of the downlink transport blocks scheduled by the first downlink control information.

According to some embodiments, the processor is further configured to cause the wireless device to: receive information configuring a set of periodic virtual downlink control information monitoring opportunity configurations; and receive information in the first control information that indicates a periodic virtual downlink control information monitoring opportunity configuration, wherein the indicated periodic virtual downlink control information monitoring opportunity configuration is selected from the configured set of periodic virtual downlink control information monitoring opportunity configurations.

According to some embodiments, the processor is further configured to cause the wireless device to: receive information configuring a set of virtual downlink control information monitoring opportunity pattern bitmaps; and receive information in the first control information that indicates a virtual downlink control information monitoring opportunity pattern bitmap, wherein the indicated virtual downlink control information monitoring opportunity pattern bitmap is selected from the configured set of virtual downlink control information monitoring opportunity pattern bitmaps.

According to some embodiments, the processor is further configured to cause the wireless device to: truncate the selected virtual downlink control information monitoring opportunity pattern bitmap if a number of bits in the selected virtual downlink control information monitoring opportunity pattern bitmap is greater than a number of downlink transport blocks scheduled by the first control information.

According to some embodiments, the processor is further configured to cause the wireless device to: extend the selected virtual downlink control information monitoring opportunity pattern bitmap if a number of bits in the selected virtual downlink control information monitoring opportunity pattern bitmap is less than a number of downlink transport blocks scheduled by the first control information, wherein the selected virtual downlink control information monitoring opportunity pattern bitmap is repeated to extend the selected virtual downlink control information monitoring opportunity pattern bitmap.

According to some embodiments, the processor is further configured to cause the wireless device to: receive virtual downlink control information format information in the first downlink control information, wherein the virtual downlink control information format information indicates one or more downlink control information formats associated with virtual downlink control information monitoring opportunities in the downlink transport blocks scheduled by the first downlink control information.

According to some embodiments, the processor is further configured to cause the wireless device to: determine virtual downlink control information format information indicating one or more downlink control information formats associated with virtual downlink control information monitoring opportunities in the downlink transport blocks scheduled by the first downlink control information based at least in part on a scrambling sequence used to scramble cyclic redundancy check (CRC) bits of the first downlink control information.

According to some embodiments, the processor is further configured to cause the wireless device to: determine that virtual downlink control information included in the downlink transport blocks scheduled by the first downlink control information are quadrature phase shift keying (QPSK) modulated; receive information indicating an aggregation level for virtual downlink control information included in the downlink transport blocks scheduled by the first downlink control information; and determine an amount of resources associated with each virtual downlink control information monitoring opportunity included in the downlink transport blocks scheduled by the first downlink control information based at least in part on the information indicating the aggregation level for virtual downlink control information included in the downlink transport blocks scheduled by the first downlink control information.

According to some embodiments, the processor is further configured to cause the wireless device to: determine that virtual downlink control information included in the downlink transport blocks scheduled by the first downlink control information are quadrature phase shift keying (QPSK) modulated; and receive information indicating an amount of resources associated with virtual downlink control information monitoring opportunities.

According to some embodiments, the processor is further configured to cause the wireless device to: determine that for a downlink transport block scheduled by the first downlink control information that includes a virtual downlink control information monitoring opportunity, the virtual downlink control information monitoring opportunity is mapped to resource elements of the downlink transport block that are not reserved for other purposes in increasing order of frequency first and time second.

According to some embodiments, the processor is further configured to cause the wireless device to: determine that for a downlink transport block scheduled by the first control information that includes a virtual downlink control information monitoring opportunity, the virtual downlink control information monitoring opportunity is mapped to resource elements distributed at edges of bandwidth of the downlink transport block.

According to some embodiments, the processor is further configured to cause the wireless device to: determine that for a downlink transport block scheduled by the first control information that includes a virtual downlink control information monitoring opportunity, the virtual downlink control information monitoring opportunity is mapped to resource elements that are interleaved with resources not associated with the virtual downlink control information monitoring opportunity.

According to some embodiments, the processor is further configured to cause the wireless device to: determine that a modulation order for virtual downlink control information included in the downlink transport blocks scheduled by the first downlink control information matches a modulation order for the downlink transport blocks scheduled by the first downlink control information; receive an indication of a scaling factor associated with virtual downlink control information; and determine a number of coded modulation symbols per layer for virtual downlink control information based at least in part on the indicated scaling factor.

Yet another set of embodiments may include a method, comprising: by a wireless device: establishing a wireless link with a cellular base station; receiving first downlink control information during a first control channel monitoring occasion, wherein the first downlink control information schedules multiple downlink transport blocks, wherein the first downlink control information includes counter downlink assignment index (C-DAI) information indicating an accumulated number of transport blocks up to a first transport block scheduled by the first downlink control information; wherein the downlink control information includes total downlink assignment index (T-DAI) information indicating a total number of transport blocks scheduled through the first control channel monitoring occasion; receiving downlink transport blocks scheduled by the first downlink control information; and transmitting hybrid automatic repeat request acknowledgement (HARQ-ACK) feedback to the cellular base station based at least in part on the C-DAI information and the T-DAI information.

According to some embodiments, the method further comprises: determining a size of one or more of the C-DAI information or the T-DAI information based at least in part on a number of downlink transport blocks that can be scheduled by downlink control information.

According to some embodiments, the method further comprises: receiving an indication of a size of one or more of the C-DAI information or the T-DAI information from the cellular base station.

According to some embodiments, the method further comprises: determining a set of possible HARQ-ACK codebook sizes for the HARQ-ACK feedback, wherein HARQ-ACK codebook size spacing in the set of possible HARQ-ACK codebook sizes is uniformly quantized.

According to some embodiments, a quantization step size of the set of possible HARQ-ACK codebook sizes is determined based on one of: a fixed quantization step size parameter; an indication of a quantization step size parameter included in system information broadcast by the cellular base station; an indication of a quantization step size parameter provided to the wireless device by the cellular base station using radio resource control (RRC) signaling; an indication of a quantization step size parameter included in the first downlink control information; a number of downlink transport blocks that can be scheduled by downlink control information.

According to some embodiments, the method further comprises: determining a set of possible HARQ-ACK codebook sizes for the HARQ-ACK feedback, wherein HARQ-ACK codebook size spacing in the set of possible HARQ-ACK codebook sizes is non-uniformly quantized.

According to some embodiments, the first downlink control information is associated with a first component carrier, wherein the method further comprises: receiving second downlink control information associated with a second component carrier during the first control channel monitoring occasion, wherein the second downlink control information schedules multiple downlink transport blocks, wherein the second downlink control information includes (C-DAI) information indicating an accumulated number of transport blocks up to a first transport block scheduled by the second downlink control information; and determining a sub-group of a set of possible HARQ-ACK codebook sizes for the HARQ-ACK feedback based at least in part on whether the C-DAI information included in the first downlink control information and the second downlink control information is ordered in ascending order or descending order according to component carrier index.

According to some embodiments, the method further comprises: transmitting an indication of a HARQ-ACK codebook size for the HARQ-ACK feedback to the cellular base station, wherein the indication of the HARQ-ACK codebook size is appended to the HARQ-ACK feedback.

According to some embodiments, the method further comprises: selecting a demodulation reference signal (DMRS) cyclic shift for an uplink transmission including the HARQ-ACK feedback based at least in part on a HARQ-ACK codebook size for the HARQ-ACK feedback, wherein the selected DMRS cyclic shift provides an indication of the HARQ-ACK codebook size for the HARQ-ACK feedback.

A still further set of embodiments may include a method, comprising: by a wireless device: establishing a wireless link with a cellular base station; receiving first downlink control information during a first control channel monitoring occasion, wherein the first downlink control information schedules multiple downlink transport blocks; selecting a first receive beam for the downlink transport blocks scheduled by the first downlink control information; and receiving the downlink transport blocks scheduled by the first downlink control information using the first receive beam.

According to some embodiments, a time offset between the first downlink control information and the downlink transport blocks scheduled by the first downlink control information is less than a quasi-co-located (QCL) duration threshold.

According to some embodiments, the method further comprises: receiving an indication of a transmission configuration indicator (TCI) state associated with the downlink transport blocks scheduled by the first downlink control information via radio resource control (RRC) signaling, wherein the first receive beam is selected based at least in part on the indication of the TCI state associated with the downlink transport blocks scheduled by the first downlink control information.

According to some embodiments, the method further comprises: monitoring a control channel during a second control channel monitoring occasion that occurs between receiving downlink transport blocks scheduled by the first downlink control information, wherein a second receive beam is used to monitor the control channel during the second control channel monitoring occasion, wherein the second receive beam is a different beam than the first receive beam, wherein a first switching gap for switching from the first receive beam to the second receive beam occurs before the second control channel monitoring occasion.

According to some embodiments, a second switching gap for switching from the second receive beam to the first receive beam occurs after the second control channel monitoring occasion.

According to some embodiments, a length of the first switching gap is determined based at least in part on a subcarrier spacing configuration.

According to some embodiments, the method further comprises: providing an indication of a preferred spatial quasi-co-located (QCL) configuration to the cellular base station, wherein the first receive beam is selected based at least in part on the indication of the preferred spatial QCL configuration.

According to some embodiments, the first receive beam is selected based at least in part on a transmission configuration indicator (TCI) state with a lowest index in a list of TCI states indicated by the cellular base station via radio resource control (RRC) signaling.

According to some embodiments, the first receive beam is selected based at least in part on a transmission configuration indicator (TCI) state of a control resource set (CORE-SET) associated with a monitored search space with a lowest index in a latest slot in which one or more CORESETS are monitored by the wireless device.

According to some embodiments, the first receive beam is selected based at least in part on a latest indication of a transmission configuration indicator (TCI) state in previously received downlink control information that scheduled multiple downlink transport blocks.

According to some embodiments, the method further comprises: providing hybrid automatic repeat request (HARQ) feedback for the downlink transport blocks scheduled by the previously received downlink control information at least a threshold amount of time before the first downlink control information is received, wherein the first receive beam is selected further based at least in part on the HARQ feedback being provided at least the threshold amount of time before the first downlink control information is received.

According to some embodiments, the method further comprises: receiving an indication of a set of transmission configuration indicator (TCI) states via radio resource control (RRC) signaling, wherein the first receive beam is selected from the set of TCI states.

According to some embodiments, the method further comprises: receiving an indication of a default TCI state via media access control (MAC) control element (CE) signaling, wherein the default TCI state is selected from the set of TCI states, wherein first receive beam is selected based on the default TCI state.

According to some embodiments, the method further comprises: receiving an indication of a default TCI state via group-common downlink control information signaling, wherein the default TCI state is selected from the set of TCI states, wherein first receive beam is selected based on the default TCI state.

According to some embodiments, the method further comprises: receiving an indication of a default TCI state via dedicated downlink control information signaling, wherein the default TCI state is selected from the set of TCI states, wherein first receive beam is selected based on the default TCI state.

According to some embodiments, the method further comprises: receiving an indication that one or more control channel monitoring occasions that temporally overlap with the downlink transport blocks scheduled by the first downlink control information are canceled.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
establish a wireless link with a cellular base station;
receive first downlink control information during a first control channel monitoring occasion, wherein the first downlink control information schedules multiple downlink transport blocks;
determine that one or more portions of the downlink transport blocks scheduled by the first downlink control information are configured as virtual downlink control information monitoring opportunities; and
monitor the one or more portions of the downlink transport blocks for virtual downlink control information.

2. The apparatus of claim 1, wherein the processor is further configured to cause the wireless device to:
determine that a virtual downlink control information monitoring opportunity is present in each of the downlink transport blocks scheduled by the first downlink control information.

3. The apparatus of claim 1, wherein the processor is further configured to cause the wireless device to:
receive information configuring a set of periodic virtual downlink control information monitoring opportunity configurations; and
receive information in the first downlink control information that indicates a periodic virtual downlink control information monitoring opportunity configuration, wherein the indicated periodic virtual downlink control information monitoring opportunity configuration is one of the configured set of periodic virtual downlink control information monitoring opportunity configurations.

4. The apparatus of claim 1, wherein the processor is further configured to cause the wireless device to:
receive information configuring a set of virtual downlink control information monitoring opportunity pattern bitmaps; and
receive information in the first downlink control information that indicates a first virtual downlink control information monitoring opportunity pattern bitmap, wherein the first virtual downlink control information monitoring opportunity pattern bitmap is one of the configured set of virtual downlink control information monitoring opportunity pattern bitmaps.

5. The apparatus of claim 4, wherein the processor is further configured to cause the wireless device to:
truncate the first virtual downlink control information monitoring opportunity pattern bitmap if a number of bits in the first virtual downlink control information monitoring opportunity pattern bitmap is greater than a number of downlink transport blocks scheduled by the first downlink control information; and
extend the first virtual downlink control information monitoring opportunity pattern bitmap if a number of bits in the first virtual downlink control information monitoring opportunity pattern bitmap is less than a number of downlink transport blocks scheduled by the first downlink control information, wherein the first virtual downlink control information monitoring opportunity pattern bitmap is repeated to extend the first virtual downlink control information monitoring opportunity pattern bitmap.

6. The apparatus of claim 1, wherein the processor is further configured to cause the wireless device to:
receive virtual downlink control information format information in the first downlink control information, wherein the virtual downlink control information format information indicates one or more downlink control information formats associated with virtual downlink control information monitoring opportunities in the downlink transport blocks scheduled by the first downlink control information.

7. The apparatus of claim 1, wherein the processor is further configured to cause the wireless device to:
determine virtual downlink control information format information indicating one or more downlink control information formats associated with virtual downlink control information monitoring opportunities in the downlink transport blocks scheduled by the first downlink control information based at least in part on a scrambling sequence used to scramble cyclic redundancy check (CRC) bits of the first downlink control information.

8. The apparatus of claim 1, wherein the processor is further configured to cause the wireless device to:
determine that virtual downlink control information included in the downlink transport blocks scheduled by the first downlink control information are quadrature phase shift keying (QPSK) modulated; and
receive information indicating an amount of resources associated with virtual downlink control information monitoring opportunities.

9. The apparatus of claim 1, wherein the processor is further configured to cause the wireless device to:
determine that for a downlink transport block scheduled by the first downlink control information that includes a virtual downlink control information monitoring opportunity, the virtual downlink control information monitoring opportunity is mapped to one or more of:
resource elements of the downlink transport block that are not reserved for other purposes in increasing order of frequency first and time second;
resource elements distributed at edges of bandwidth of the downlink transport block; or
resource elements that are interleaved with resources not associated with the virtual downlink control information monitoring opportunity.

10. The apparatus of claim 1, wherein the processor is further configured to cause the wireless device to:
  determine that a modulation order for virtual downlink control information included in the downlink transport blocks scheduled by the first downlink control information matches a modulation order for the downlink transport blocks scheduled by the first downlink control information;
  receive an indication of a scaling factor associated with virtual downlink control information; and
  determine a number of coded modulation symbols per layer for virtual downlink control information based at least in part on the indicated scaling factor.

11. A wireless device, comprising:
  a radio; and
  a processor, communicatively coupled to the radio, wherein the wireless device is configured to:
  establish a wireless link with a cellular base station;
  receive first downlink control information during a first control channel monitoring occasion, wherein the first downlink control information schedules multiple downlink transport blocks,
  determine that one or more portions of the downlink transport blocks scheduled by the first downlink control information are configured as virtual downlink control information monitoring opportunities; and
  monitor the one or more portions of the downlink transport blocks for virtual downlink control information.

12. The wireless device of claim 11, wherein the wireless device is further configured to:
  determine that a virtual downlink control information monitoring opportunity is present in each of the downlink transport blocks scheduled by the first downlink control information.

13. The wireless device of claim 11, wherein the wireless device is further configured to:
  receive information configuring a set of periodic virtual downlink control information monitoring opportunity configurations; and
  receive information in the first downlink control information that indicates a periodic virtual downlink control information monitoring opportunity configuration, wherein the indicated periodic virtual downlink control information monitoring opportunity configuration is one of the configured set of periodic virtual downlink control information monitoring opportunity configurations.

14. The wireless device of claim 11, wherein the wireless device is further configured to:
  receive information configuring a set of virtual downlink control information monitoring opportunity pattern bitmaps; and
  receive information in the first downlink control information that indicates a first virtual downlink control information monitoring opportunity pattern bitmap, wherein the first virtual downlink control information monitoring opportunity pattern bitmap is one of the configured set of virtual downlink control information monitoring opportunity pattern bitmaps.

15. The wireless device of claim 11, wherein the wireless device is further configured to:
  receive virtual downlink control information format information in the first downlink control information, wherein the virtual downlink control information format information indicates one or more downlink control information formats associated with virtual downlink control information monitoring opportunities in the downlink transport blocks scheduled by the first downlink control information.

16. A method, comprising:
  establish a wireless link with a wireless device;
  transmit, to the wireless device, first downlink control information during a first control channel monitoring occasion, wherein the first downlink control information schedules multiple downlink transport blocks in a downlink shared channel, wherein one or more portions of the downlink transport blocks scheduled by the first downlink control information are configured as virtual downlink control information monitoring opportunities; and
  transmit, to the wireless device, second downlink control information during one of the one or more portions of the downlink transport blocks in the downlink shared channel.

17. The method of claim 16, wherein a virtual downlink control information monitoring opportunity is present in each of the downlink transport blocks scheduled by the first downlink control information.

18. The method of claim 16, further comprising:
  transmit information configuring a set of periodic virtual downlink control information monitoring opportunity configurations; and
  transmit information in the first downlink control information that indicates a periodic virtual downlink control information monitoring opportunity configuration, wherein the indicated periodic virtual downlink control information monitoring opportunity configuration is selected from the configured set of periodic virtual downlink control information monitoring opportunity configurations.

19. The method of claim 16, further comprising:
  transmit information configuring a set of virtual downlink control information monitoring opportunity pattern bitmaps; and
  transmit information in the first downlink control information that indicates a virtual downlink control information monitoring opportunity pattern bitmap, wherein the indicated virtual downlink control information monitoring opportunity pattern bitmap is selected from the configured set of virtual downlink control information monitoring opportunity pattern bitmaps.

20. The method of claim 16, further comprising:
  transmit virtual downlink control information format information in the first downlink control information, wherein the virtual downlink control information format information indicates one or more downlink control information formats associated with virtual downlink control information monitoring opportunities in the downlink transport blocks scheduled by the first downlink control information.

* * * * *